US011531317B2

(12) United States Patent
Tao et al.

(10) Patent No.: US 11,531,317 B2
(45) Date of Patent: Dec. 20, 2022

(54) AUTOMATIC VISION GUIDED INTELLIGENT FRUITS AND VEGETABLES PROCESSING SYSTEM AND METHOD

(71) Applicants: UNIVERSITY OF MARYLAND, COLLEGE PARK, College Park, MD (US); INDUSTRY VISION AUTOMATION CORPORATION, College Park, MD (US)

(72) Inventors: Yang Tao, North Potomac, MD (US); Dongyi Wang, Greenbelt, MD (US); Robert Vinson, Rockville, MD (US); Xuemei Cheng, Rockville, MD (US); Maxwell Holmes, Washington, DC (US); Gary E. Seibel, Westminster, MD (US)

(73) Assignee: University of Maryland, College Park, College Park, MD (US)

( * ) Notice: Subject to any disclaimer, the term of this patent is extended or adjusted under 35 U.S.C. 154(b) by 267 days.

(21) Appl. No.: 15/929,960

(22) Filed: May 29, 2020

(65) Prior Publication Data

US 2020/0379427 A1    Dec. 3, 2020

Related U.S. Application Data

(60) Provisional application No. 62/855,551, filed on May 31, 2019.

(51) Int. Cl.
*G05B 19/402*    (2006.01)
*G06T 7/00*    (2017.01)
(Continued)

(52) U.S. Cl.
CPC ....... *G05B 19/402* (2013.01); *G05B 19/4166* (2013.01); *G06F 9/3009* (2013.01);
(Continued)

(58) Field of Classification Search
None
See application file for complete search history.

(56) References Cited

U.S. PATENT DOCUMENTS

| 9,364,020 | B2 | 6/2016 | Tao et al. |
| 10,285,429 | B2 | 5/2019 | Tao et al. |
| 2022/0078972 | A1* | 3/2022 | Faulring ................ A01D 46/28 |

OTHER PUBLICATIONS

T. Brosnan, et al. "Inspection and grading of agricultural and food products by computer vision systems" Comp and Elec in Agriculture 36 (2-3) (Nov. 2002), pp. 193-213. doi: 10.1016/S0168-1699(02)00101-1.
(Continued)

*Primary Examiner* — Leon Flores
(74) *Attorney, Agent, or Firm* — Rosenberg, Klein & Lee

(57) ABSTRACT

Intelligence guided system and method for fruits and vegetables processing includes a conveyor for carrying produces, various image acquiring and processing hardware and software, water and air jets for cutting and controlling the position and orientation of the produces, and a networking hardware and software, operating in synchronism in an efficient manner to attain speed and accuracy of the produce cutting and high yield and low waste produces processing. The 2nd generation strawberry decalyxing system (AVID2) uniquely utilizes a convolutional neural network (AVIDnet) supporting a discrimination network decision, specifically, on whether a strawberry is to be cut or rejected, and computing a multi-point cutline curvature to be cut along by rapid robotic cutting tool.

20 Claims, 10 Drawing Sheets

(51) Int. Cl.
  *G06T 7/20* (2017.01)
  *G06N 3/08* (2006.01)
  *G05B 19/416* (2006.01)
  *G06F 9/30* (2018.01)

(52) U.S. Cl.
  CPC .......... *G06F 9/30087* (2013.01); *G06N 3/08* (2013.01); *G06T 7/0004* (2013.01); *G06T 7/20* (2013.01); *G05B 2219/37336* (2013.01); *G05B 2219/40554* (2013.01); *G06T 2207/20081* (2013.01); *G06T 2207/20084* (2013.01); *G06T 2207/30128* (2013.01); *G06T 2207/30241* (2013.01)

(56) References Cited

OTHER PUBLICATIONS

A. Durand-Petiteville, et al. "Real-time segmentation of strawberry flesh and calyx from images of singulated strawberries during postharvest processing." Comp and Elec in Agriculture 142(A) (Nov. 2017), pp. 298-313. doi: 10.1016/j.compag.2017.09.011.

S. Hayashi, et al. "Evaluation of a strawberry-harvesting robot in a field test." Biosys Eng 105 (Feb. 2010), pp. 160-171. doi: 10.1016/j.biosystemseng.2009.09.011.

A. Kamilaris, et al. "Deep learning in agriculture: A survey." Comp and Elec in Agriculture 147 (Apr. 2018), pp. 70-90. doi: 10.1016/j.compag.2018.02.016.

J. Lin, et al. "Design and testing of an automated high-throughput computer vision guided waterjet knife strawberry calyx removal machine." J Food Eng 211(34) (Oct. 2017), pp. 30-38. doi: 10.1016/j.jfoodeng.2017.05.002.

M. Mirza, et al. "Conditional generative adversarial nets." (Nov. 2014). arXiv: 1411.1784.

C. Ni, et al. "Automatic inspection machine for maize kernels based on deep convolutional neural networks" Biosys Eng 178 (Feb. 2019), pp. 131-144. doi: 10.1016/j.biosystemseng.2018.11.010.

L.M. OO, et al. "A simple and efficient method for automatic strawberry shape and size estimation and classification." Biosys Eng 170 (Jun. 2018), pp. 96-107. doi: 10.1016/j.biosystemseng.2018.04.004.

R. Ranjan, et al. "HyperFace: A deep multi-task learning framework for face detection, landmark localization, pose estimation, and gender recognition." IEEE Trans on Pattern Analysis and Machine Intelligence 41(1) (Mar. 2016), pp. 121-135. doi: 10.1109/TPAMI.2017.2781233.

K. Simonyan, et al. "Very deep convolutional networks for large-scale image recognition." (Sep. 2014). arXiv:1409.1556.

D. Wang, et al. "Machine vision guided robotics for blue crab disassembly—deep learning based crab morphology segmentation." 2018 ASABE Annual International Meeting (Jul. 2018), p. 1800570. doi: 10.13031/aim.201800570.

D. Wang, et al. "Vision Intelligence guided strawberry decalyx machine—automatic vision-guided intelligent decalyxing network (AVIDnet)." 2019 ASABE Annual International Meeting (Jul. 2019), p. 1901905. doi: 10.13031/aim.201901905.

M. D. Zeiler, et al. "Visualizing and understanding convolutional networks." In ECCV 2014, Part I, LNCS 8689 (2014), pp. 818-833. doi: 10.1007/978-3-319-10590-1_53.

* cited by examiner

AUTOMATIC VISION GUIDED INTELLIGENT FRUITS AND VEGETABLES PROCESSING SYSTEM AND METHOD

FIELD OF INVENTION

The present system is a fully automated visual data guided fruits and vegetables processing system, specifically, for removal of unwanted parts of fruits and vegetables, and in certain implementations, the present system addresses the intelligence guided strawberry decalyxing machine and method.

In overall concept, the present system relates to the intelligence guided system for fruits and vegetables processing which includes a variety of operatively interrelated elements including conveyor belts and shakers for carrying and moving fruits, various image acquiring and processing hardware and software, water and air jets (or nozzles) for cutting and controlling the position and orientation of the fruits and/or vegetables, and a networking hardware and software, operating in synchronism in an efficient manner to attain speed and accuracy of the fruit cutting, thus attaining high yield and low waste fruits/vegetables processing.

Even more in particular, the subject system addresses the $2^{nd}$ generation strawberry decalyxing system (AVID2) having an effectively improved machine's production capacity attained by uniquely utilizing a convolutional neural network (AVIDnet) supporting a discrimination network decision, specifically, on whether a strawberry on a belt is to be cut or rejected.

The present system provides a high yield automatic decalyxing of strawberries capable of rapid robotic curved cut along strawberry calyx curvatures.

The subject system is further directed to fully automated visual data guided decalyxing of strawberries which is embedded with a highly accurate regression deep neural network integrated into the discrimination network (responsible for a decision on cutting strawberries) and equipped with cutting waterjets capable of controlled movements following an ideal cut trajectory computed by the regression deep neural network.

BACKGROUND OF THE INVENTION

Strawberry is a type of delicious and nutrient-rich fruit suitable for all ages. Only in United States, the annual strawberry production has increased about 30% from 2008 to 2017.

In general, the strawberry utilization can be categorized in the fresh utilization and the processing utilization. In 2017, processed strawberries in the United States reached 622 million pounds with annual valuation of $187 million. The processed strawberries can directly satisfy the consumer demands for fresh-cut packaged fruit or be used for making ice cream or yogurt.

Before the strawberries reach consumers, the calyx of strawberries must be removed in advance at the post-harvest stage. Currently, the decalyx procedure is mainly conducted in the field by human, which is labor intensive and time-consuming. As the added cost and time, the decalyxing also needs to maintain cutting tool sanitized through the entire procedure.

The afore-noted practical problems and market demands have led to development of automated strawberry decalyx machines. With the quick advancement of computer vision techniques, the vision guided food processing has gradually replaced the early stage purely mechanical machines (T. Brosnan, et al., "Inspection and grading of agricultural and food products by computer vision systems", Computers and electronics in agriculture, 2002, 36 (2-3), 193-213). Particularly, vision-guided strawberry processing systems are used for harvesting (as presented in S. Hayashi, et al., "Evaluation of a strawberry-harvesting robot in a field test", Biosystems engineering, 2010, 105(2), 160-171), grading (L. M. Oo, et al., "A simple and efficient method for automatic strawberry shape and size estimation and classification", Biosystems engineering, 2018, 170, 96-107), and decalyxing (A. Durand-Petiteville, et al., "Real-time segmentation of strawberry flesh and calyx from images of singulated strawberries during postharvest processing", Computers and electronics in agriculture, 2017, 142, 298-313).

For example, A. Durand-Petiteville, et al., conducted preliminary studies on the strawberry meat and calyx segmentation using a threshold-based image processing algorithm A first strawberry decalyxing machine (Y. Tao, et al., "Automated fruit and vegetable calyx or stem removal machine", U.S. Pat. Nos. 10,285,429 and 9,364,020) was developed in 2016. It was based on a different threshold-based image processing algorithm. The system is referred to herein as the first generation Automatic vision-guided intelligent decalyxing (AVID1). The AVID1 was tested extensively in field for guiding high pressure waterjet movement to decalyx strawberries (J. Lin, et al., "Design and testing of an automated high-throughput computer vision guided waterjet knife strawberry calyx removal machine", Journal of Food Engineering, 2017, 211, 30-38).

The AVID1 machine includes three main components, such as (a) a strawberry loading and orientation conveyor, (b) a machine vision station, and (c) a synchronized multi-waterjet knife calyx removal actuation system. The first generation of AVID system (AVID1) solves several key problems in the automatic strawberry decalyx procedure. Firstly, the roller rod based strawberry handling system was designed for the strawberry singulation and correct rotation. Secondly, the conveyor, computer vision station and waterjet actuation station were well synchronized based on the conveyor shaft encoder. The computer registers each calyx's removal location as coordinates with respect to the conveyor. Last, but not the least, in order to maintain an accurate high-quality calyx removal cut, air clamps were designed to stabilize the strawberry before entering the waterjet cutting stream.

In practice, the threshold-based image processing algorithms (such as those used in A. Durand-Petiteville, et al.) are not robust enough to strawberry variations. Meanwhile, even ideal strawberry meat and calyx segmentation cannot ensure the ideal decalyx cutline generation, because in the decalyx machine, strawberries could tilt up or down in the z axis direction. Directly following the boundary between the strawberries' meat and the calyx would sacrifice parts of the strawberry meat. In the first generation of AVID, although delicate roller rods were embedded in the system, some strawberries still could not be ideally aligned. A rejection algorithm was needed to actively avoid the waterjet cutting stream. However, the rejection algorithm based on the handcrafted image features was also sensitive to strawberry variations in shape and orientation.

Thus, based on the large scale in-field test results, the AVID1 system pended to be improved with respect to two aspects:

(a) Since some berries are tilted up or down in the z axis direction (even though the roller rods were installed to handle the strawberry into the correct orientation), the tilted strawberries need to be rejected because the waterjet design is not able to handle the 3D berry cut in this situation. The orientation angle threshold based rejection method was not robust enough to strawberry variations. It is not a trivial work to estimate the strawberry 3D orientation from 2D images.

(b) The cutline in the AVID1 system is determined based on the centroid point of the segmented strawberry meat, which is parallel to the y-axis, and the waterjet only moved in x-axis between two strawberry cuts. However, this crude cut strategy could only handle the aligned berries, but not those oriented diagonally, perpendicularly, and/or tilted ones. Even more, even for the aligned berries, the cutline can still be improved due to strawberries shape variations.

It therefore would be highly desirable to improve the performance of the AVID1 system by embedding therein a data processing concept distinct from the rejection algorithm in order to avoid the shortcomings of the AVID1 system and other fruit processing machines.

Deep learning algorithms have been attractive methods in many food and agriculture applications (A. Kamilaris, et al., "Deep learning in agriculture: A survey", Computers and electronics in agriculture, 2018, 147, 70-90). However, so far, the deep neural network has been utilized to segment the processing object and use the traditional template matching method for each segment to generate a cutline (D. Wang, et al., "Machine Vision Guided Robotics for Blue Crab Disassembly—Deep Learning Based Crab Morphology Segmentation", Paper presented at the 2018 ASABE Annual International Meeting), which has low robustness to strawberry variations.

Thus, an intelligent strawberry decalyxing system integrated with the deep learning algorithm which would ensure the cutline generation accuracy and efficiency would be enthusiastically welcomed in the fruit processing industry.

SUMMARY OF THE INVENTION

It is therefore an object of the present invention to provide an improved second generation of Automatic vision-guided intelligent decalyxing (AVID2) system which includes an image acquiring and processing hardware and software, water and air jets (or nozzles) for cutting and controlling the position and orientation of the fruits, and a deep learning networking hardware and software, operating in synchronism in an efficient manner to attain speed and accuracy of the fruit cutting, and attaining high yield and low waste fruit processing not possible in the conventional systems for fruit decalyxing.

It is an additional object of the present invention to provide an improved strawberry decalyxing system equipped with a network architecture (referred to herein as the automatic vision-guided intelligent decalyxing network (AVIDnet)), using a deep learning algorithm adapted for the strawberry alignment rejection classification and capable of generating an ideal food processing cutline based on end-to-end learning by fusing the low-level, middle-level and high-level deep features.

It is another object of the present invention to provide a fully automated visual data guided decalyxing system which is embedded with a highly accurate regression deep neural network integrated into the discrimination network (responsible for a decision making on cutting strawberries) and equipped with cutting waterjets capable of controlled movements following an ideal cut trajectory computed by the regression deep neural network.

It is a further object of the subject invention to provide the 2nd generation strawberry decalyxing system (AVID2) having an effectively improved machine's production capacity attained by uniquely utilizing a convolutional neural network (AVIDnet) supporting a discrimination network decision, specifically, whether a strawberry on a belt is to be cut, and capable of rapid robotic curved cut along strawberry calyx curvatures.

In the subject AVID2 system, the deep learning model network is embedded which aims to solve two problems. Firstly, it is adapted for the strawberry alignment rejection classification, which is very similar to the good/bad sorting task (C. Ni, et al., "Automatic inspection machine for maize kernels based on deep convolutional neural networks", Biosystems engineering, 2019, 178, 131-144). Secondly, the network generates the strawberry decalyxing cutline on the end-to-end basis as opposed to the segmented approach of the D. Wang, et al., 2018.

The AVID2 is the first application to use the deep neural learning network to generate the food processing cutline. Instead of doing end-to-end learning, former research utilized deep neural network to firstly segment the processing object and then using the traditional template matching method to generate cutline. End-to-end model needs to manually label the ideal cutline but can achieve better robustness to strawberry variations. To avoid resolution loss due to the maxpooling operation in the convolutional neural network, low-level, middle-level and high-level deep features are fused in the AVID2 to ensure the cutline generation accuracy. Meanwhile, an embedding design is integrated in the network to avoid the ground truth contradiction resulting from data labelling and augmentation.

In one aspect, the present system is directed to a vision-guided automated intelligent system for removal of an unwanted portion of a produce, which comprises:
- a loading station for entering a plurality of produces into the system;
- a vision station operatively coupled to the loading station and equipped with images acquisition sub-system for acquiring images of the produces received from the loading station; and
- a cutting station operatively coupled to the vision station and equipped with a cutting mechanism for removal of an unwanted portion of the produces. The cutting station is configured to separate the unwanted portions from the produces according to separation trajectories.

The system further includes:
- an unloading station operatively coupled to the cutting station for unloading produces devoid of said the unwanted portion;
- a conveyor sub-system operatively coupled to the loading, vision, cutting and unloading stations to transport the produces; and
- a processor sub-system (also referred to herein as a visual processor sub-system) operatively coupled at least to the vision, cutting and unloading stations and the conveyor sub-system.

The subject system also includes a network training mechanism operatively coupled to the processor sub-system. The network training mechanism includes a bank of the training images, each training image being provided with a corresponding ground truth cutline.

The visual processor sub-system includes (among other functional parts):
(a) a convolutional neural network trained by the network training mechanism to identify at least a first produce oriented properly for cutting and at least a second produce oriented in such a way that it cannot be cut and thus has to be rejected from cutting, (b) a regression deep neural network integrated in the convolutional neural network and trained by interacting with the network training mechanism to compute a cutline trajectory for at least the first and second produces based on the images of the produces acquired by the images acquisition sub-system at the vision station, and (c) a synchronization processor unit including at least one shaft encoder configured to track locations of the unwanted portions of the produces based on the images of the produces acquired by the images acquisition sub-system at the vision station.

Preferably, the synchronization processor unit is configured to synchronize motion of the conveyor sub-system with actuation of the cutting mechanism for cutting the at least first produce along a respective cutline trajectory computed for the at least first produce and with refraining the cutting mechanism from an interaction with the at least second produce.

In one of the implementations of the subject system, it is adapted for processing of strawberries to remove calyx (as an unwanted portion) of the strawberry.

The conveyor sub-system in the preferred implementation includes an arranging mechanism configured for separation of the strawberries entering the loading station into a plurality of rows and orienting at least two of the strawberries in each row in a substantially aligned relationship one with another.

The convolutional neural network is trained to identify at least first produce for cutting and at least a second produce for rejection based on the strawberry alignment rejection classification.

The visual processor sub-system is configured to identify a calyx location based on the images acquired by the images acquisition sub-system and to determine separation paths between the calyxes and the strawberries.

The cutting station includes a calyx removal sub-system configured to separate the calyxes from the strawberries according to the separation cutline trajectories determined by the processor sub-system, wherein the calyx removal sub-system is synchronized with the conveyor sub-system by at least one conveyor shaft encoder configured to track locations of the calyxes.

The cutting mechanism at the cutting station in one embodiment may include an array of robotic high-pressure waterjet knives. The synchronization processor unit communicates with at least one respective robotic waterjet knife from the array thereof to actuate the cutting action along the cutline trajectory computed for the at least first strawberry.

The synchronization processor unit communicates with at least one respective robotic waterjet knife from the array thereof to de-activate the cutting action thereof with regard to the at least second strawberry or to displace the at least one respective robotic waterjet knife from interaction with the at least second strawberry.

The unloading station is equipped with an array of air nozzles configured to interact with the at least first strawberry for immobilization thereof during the cutting action of the at least one respective robotic waterjet knife. Alternatively, or in addition to this function, the array of air nozzles is configured to interact with the at least second strawberry to remove it from the conveyor sub-system.

The conveyor sub-system includes a loading station's conveyor portion, a vision station's conveyor portion, a cutting station's conveyor portion and a unloading station's conveyor portion operatively interconnected one with another and having a shaft mechanism, wherein at least one of the loading station's conveyor portion, vision station's conveyor portion, cutting station's conveyor portion and unloading station's conveyor portion is equipped with the shaft encoder and a motor control sub-system coupled to the shaft encoder, cutting mechanism and shaft mechanism to displace the conveyor sub-system in synchronism with actuation of the cutting mechanism.

The cutline trajectory for each strawberry is a multi-point spline including a plurality N of points (for example, N=128, or any other number of points sufficient to develop a curve line), wherein the shaft encoder produces at least one digital signal for each point from the plurality N thereof for input into the Processor sub-system.

The processor sub-system receives and processes each digital signal input from the shaft encoder at a high rate and with high resolution for each point of the multi-point spline and generates a corresponding control signal which is output from said processor sub-system to the motor control sub-system supported for example by Ethercat (or another fast) communication protocol.

The latency of the receipt of the digital signals at the processor sub-system from the shaft decoder for the plurality of points is minimized by connecting, between the shaft decoder and the processor sub-system, of a fieldbus with internal polling and synchronization of DIO threads, thus providing the execution of the uninterrupted point-to-point actuation and movement of the cutting mechanism in synchronism with the displacement of the conveyor sub-system.

The present system further includes a messaging mechanism coupled between the fieldbus and the processor sub-system for transmitting packets containing the multi-point spline information therebetween, where each packet includes the multi-point spline, an Importance Boolean flag for each point of the multi-point spline, and an index based on the shaft encoder's digital input signal. Preferably, the messaging mechanism is an independent communication mechanism supported by an Automated Device Specification (ADS) framework, such as for example the Beckhoff's ADS framework. The inclusion of this messaging mechanism allows to attain the motion of the cutting mechanism in accordance to the continuous multi-point spline with actuation timing synchronized to the displacement of the conveyor sub-system and positions of the calyx of the strawberries determined by the processor sub-system based on the images produced by the images acquisition sub-system at the vision station.

In one embodiment, the strawberry rejection decision is made by the convolutional neural network of the processor sub-system based on the orientation of the strawberries classified as being aligned, tilted, diagonal, perpendicular, calyx-up or tip-up. The processor sub-system, based on the rejection decision of the convolutional neural network, commands the cutting mechanism to refrain from interacting with the strawberries which are poorly oriented and thus rejected. Preferably, the rejected strawberries are removed from the cutting station and re-enters the loading station.

In overall concept, the processor sub-system includes a second generation automatic vision-guided intelligent decalyxing network (AVIDnet) which is operatively coupled to the vision station to receive therefrom at least one raw image of a strawberry. The AVIDnet being configured to process the raw image and to generate, at an output thereof, a cutline trajectory location, rejection determination result, auxiliary output information, and cutline guide information. The AVIDnet is configured with a plurality of convolutional blocks for filtering the raw image. Each convolutional block has a number of convolutional layers and a dense layer, wherein one of the convolutional blocks is a source of hyper features of the image. The hyper features of the image are connected to the dense layer of each convolutional block to result in the strawberry rejection determination and production of the cutline guide information.

The AVIDnet further comprises a mechanism for avoiding the ground truth contradiction, where this mechanism includes an embedding layer integrated in the AVIDnet and containing conditional information for the symmetry classification including non-horizontally symmetric strawberries, horizontally symmetric strawberries with the cutline start from left-to-right, and horizontally symmetric strawberries with the cutline start from right-to-left. The hyper features are processed to obtain the symmetry classification.

A method for vision-guided automated removal of an unwanted portion of a produce represents another aspect of the subject arrangement. The subject method comprises the operational steps of:

entering a plurality of produces into a loading station;

operatively coupling a vision station to the loading station, equipping the vision station with images acquisition sub-system, and acquiring images of the produces received from the loading station; and operatively coupling a cutting station to the vision station, establishing a cutting mechanism at the cutting station for removal of an unwanted portion of the produces. The cutting station is configured to separate the unwanted portions from the produces according to separation trajectories.

The subject method further continues with operatively coupling an unloading station to the cutting station for unloading produces devoid of the unwanted portion;

operatively coupling a conveyor sub-system to the loading, vision, cutting and unloading stations and transporting the produces; and operatively coupling a visual data processor sub-system at least to the vision, cutting and unloading stations and the conveyor sub-system.

An important operation of the subject method includes the step of operatively coupling a network training mechanism to the visual processor sub-system, and feeding the network training mechanism with a set of training produces images, where each produce image is provided with a corresponding ground truth cutline.

The subject method further includes the operational steps of:

configuring the visual processor sub-system with (a) a convolutional neural network, (b) a regression deep neural network integrated in said convolutional neural network, and (c) a synchronization processor unit configured with at least one shaft encoder;

training the convolutional neural network through the network training mechanism to identify at least a first produce from its plurality which is oriented properly for being cut and at least a second produce which is poorly oriented and thus has to be rejected from cutting;

training the regression deep neural network to compute a cutline trajectory for at least first and second produces based on the images of the produces acquired by the images acquisition sub-system at the vision station;

tracking, by the shaft encoder, locations of the unwanted portions of the produces based on the images of the produces acquired by the images acquisition sub-system at the vision station;

synchronizing, by the synchronization processor unit, a displacement of the conveyor sub-system with actuation of the cutting mechanism; cutting the first produce along a respective cutline trajectory computed for the first produce; and refraining the cutting mechanism from an interaction with the second produce.

The subject method may be applicable to different produces. In one implementation, the method in question is adapted for decalyxing strawberries.

In this particular application, the subject method continues with the operations of:

arranging strawberries into a plurality of rows and orienting at least two of the strawberries in each row in a substantially aligned relationship one with another, and identifying, by the convolutional neural network, at least first produce oriented properly for cutting and at least a second produce oriented poorly and thus a candidate for rejection based on the strawberry alignment rejection classification.

The method further comprises the steps of:

identifying, by the visual processor sub-system, a calyx location based on the images acquired by the images acquisition sub-system;

determining separation paths between the calyxes and the strawberries;

equipping the cutting station with a calyx removal sub-system configured to separate the calyxes from the strawberries according to the separation cutline trajectories determined by the visual processor sub-system, tracking locations of the calyxes by the shaft encoder, and synchronizing the calyx removal sub-system with the conveyor sub-system.

The method further advances by the steps of:

forming the cutline trajectory for each strawberry as a multi-point spline including a plurality N of points, producing, by the shaft encoder, at least one input digital signal for each point from said plurality N thereof, coupling a motor control sub-system to the shaft encoder, receiving and processing the input digital signals from the visual processor sub-system and the shaft encoder at a high rate and with high resolution for each point and generating a corresponding control signal, outputting the corresponding control signal from the visual processor sub-system to the motor control sub-system supported by Ethercat (or another fast) communication protocol, reducing the latency of the receipt of the digital signals at the visual processor sub-system from the shaft decoder for the plurality of points by connecting, between the shaft decoder and the visual processor sub-system, of a fieldbus with internal polling and synchronization of DIO threads, thus providing the execution of the uninterrupted point-to-point actuation and movement of the cutting mechanism in synchronism with the displacement of said conveyor sub-system, and coupling a messaging mechanism between the fieldbus and the processor sub-system for transmitting packets containing the multi-point spline information therebetween, each of the packets including the multi-point spline, an Importance Boolean flag for each point of the multi-point spline, and an index based on the shaft encoder's digital input signal, wherein the messaging mechanism is an independent communication mechanism supported by Beckhoff's Automated Device Specification (ADS) framework, thus attaining the motion of the cutting mechanism in accordance to the continuous multi-point spline with actuation timing synchronized to the displacement of the conveyor sub-system and positions of the calyx of the strawberries determined by the processor sub-system based on the images produced by the images acquisition sub-system at the vision station.

These and other objects and advantages of the subject system and method for automatic vision-guided intelligent decalyxing of strawberries will become apparent when considered in view of further descriptions accompanying the Patent Drawings.

BRIEF DESCRIPTION OF THE DRAWINGS

FIG. 5D is representative of the poor cutline choice;

DESCRIPTION OF THE SUBJECT SYSTEM AND METHOD

Figure 1:
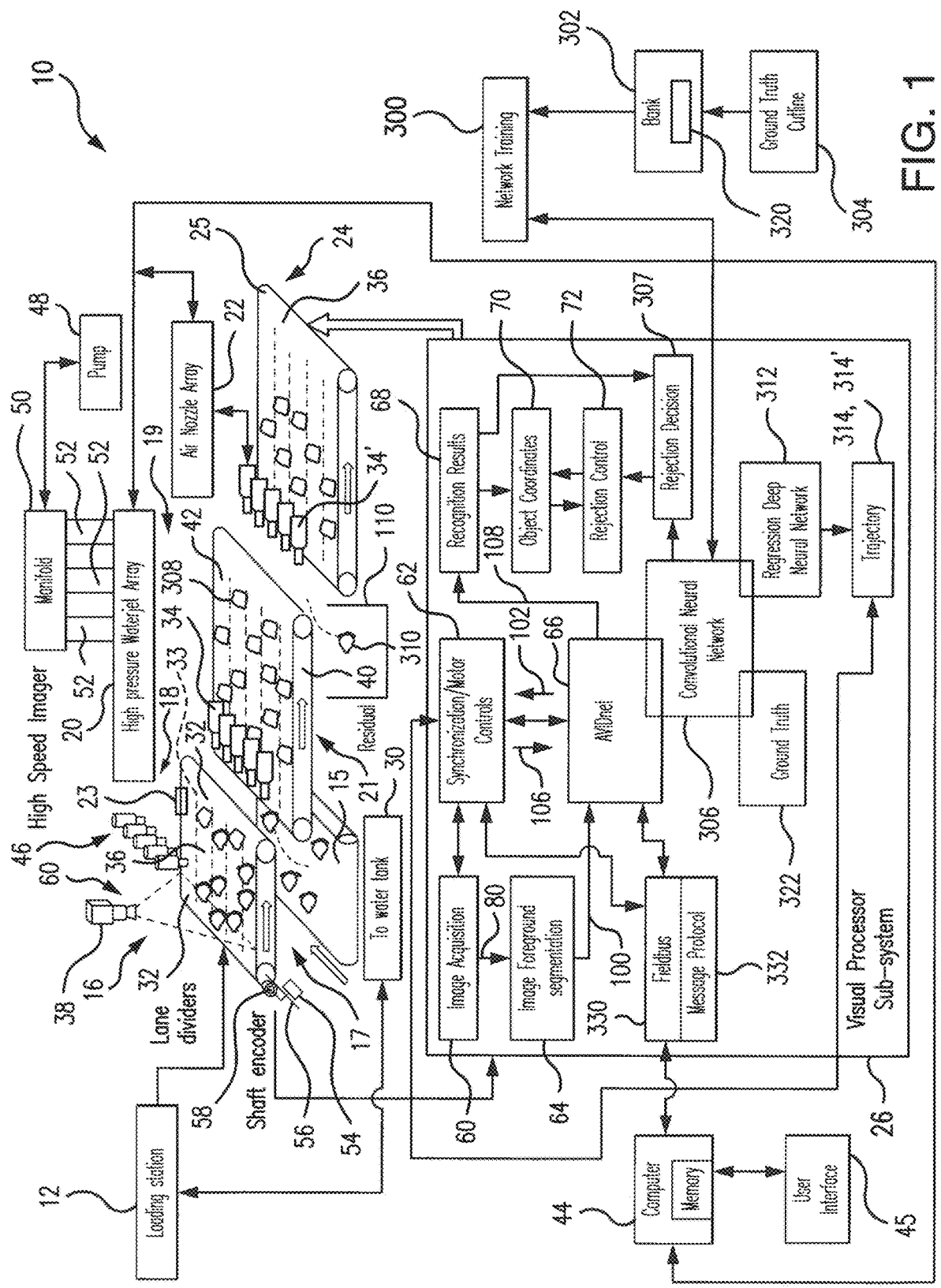
FIG. 1 is a schematic block-diagram of the subject automatic vision intelligent guided strawberry decalyxing system.

Referring to FIGS. 1, 1A-1B, and 2-3, the subject Vision Guided and Motor Actuated system 10 is capable of a fully automated removal of unwanted parts of produces, including various fruits and vegetables. As an example only, but not to limit the scope of the subject system and method to a particular produce, further description of the subject system will address an exemplary embodiment which is the Automated Vision-guided Intelligent strawberry decalyxing system. It is to be understood that the principles of the design and operation of the strawberry decalyxing system presented herein are fully applicable to removal of unwanted parts form other fruits and vegetables as well.

The present Automated Vision-guided Intelligent strawberry decalyxing system 10 includes a loading station 12 having a feeding conveyer 13 followed by a strawberry orientation conveyer 14. The feeding conveyer 13 and the orientation conveyer may be referred to herein as a loading and orientation conveyer 14. The loading station 12 also is equipped with a water tank 30.

Following the loading station 12, are a vision station 16 and a rejection station 17. The rejection station 17 is composed of a rejection conveyer 15 and an array of rejection jets 34. A calyx removal station (also referred to herein as a cutting station) 18 is operatively coupled to the rejection station 17 and the vision station 16. The cutting station 18 includes a synchronized cutting mechanism, represented, for example, by an array 46 of high pressure waterjet nozzles (also referred to herein as waterjet knifes) 20 for calyx removal. The array 46 of the waterjet knives 20 (schematically shown in FIG. 1) is a dynamically displaceable unit which is located in operative coupling to the conveyor portion 32 to be able to controllably cut the strawberries (qualifying for this) along curvatures computed by the AVIDnet, as will be detailed in the following paragraphs.

A screen sizer station 21 operatively follows the conveyor 32. The screen sizer station 21 is designed as a conveyor with metal bars/rails defining gaps 42 therebetween, so that the berries after the cutting station 18 travel therealong. At the station 21, the cut out calyxes can fall from the conveyor through the gaps between the rails, and after the station 21, only decalyxed berries enter the unloading station 24. An array 23 of air nozzles may be provided at the cutting station 18, and an array 22 of the air nozzles 34' may be provided (optionally) at the unloading station 24 in the operative coupling to the unloading conveyor 25. The array 23 of air nozzles is schematically shown in FIG. 1 as positioned in proximity to (or below) the waterjet array 46. The air streams generated by the air nozzles 23 hold down (immobilize) the berries on the conveyor 32 in firm contact with the conveyor 32 to prevent the berries from the bouncing up motion during the cutting procedure.

Air nozzles 34 may be provided after the stations 16/18 to help with sorting/removing the rejected strawberries to the rejection conveyor 15. The array 22 of the air nozzles 34' at the unloading station 24 operates to perform a sorting for removing defects as part of the quality control.

Figure 1A:
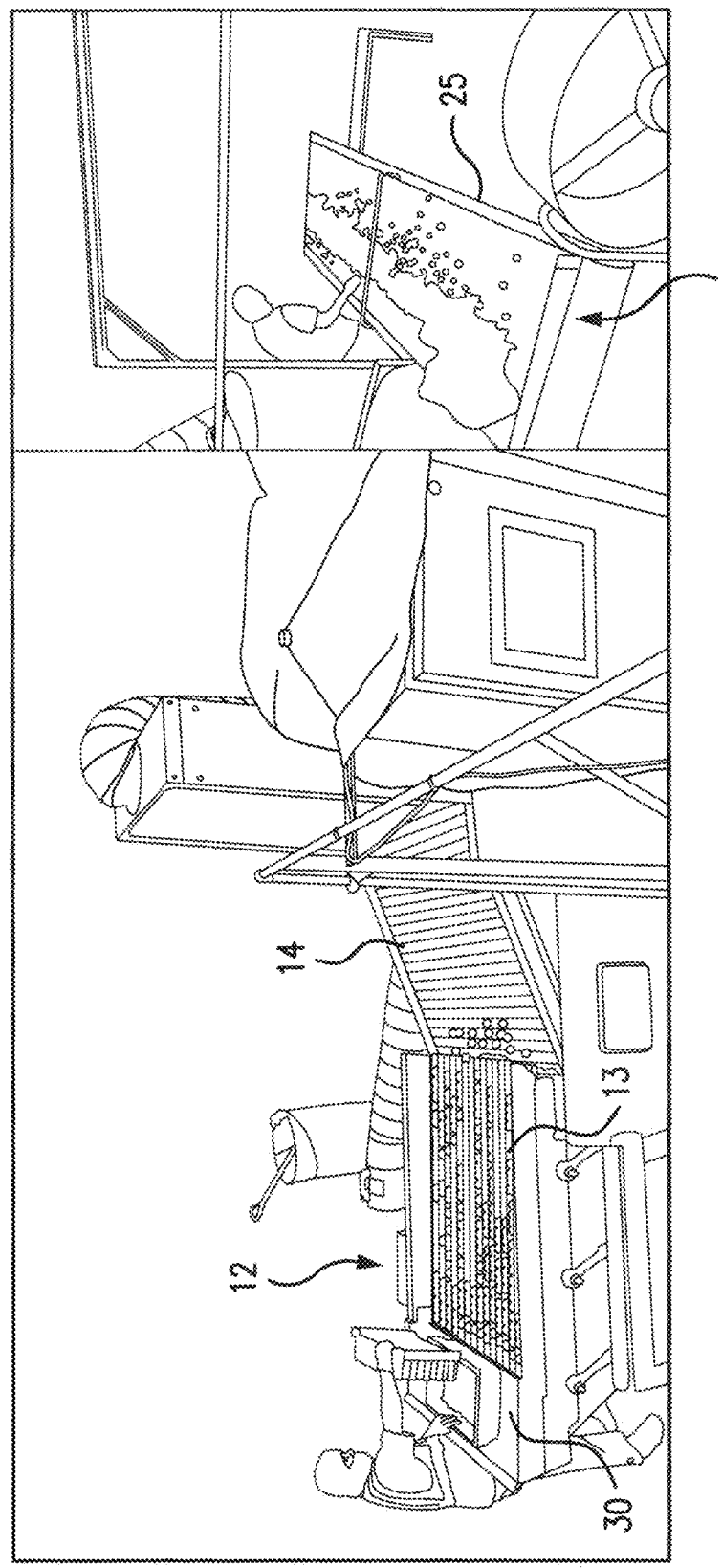
FIGS. 1A and 1B are pictorial representations of the side views of the subject system.
Figure 1B:
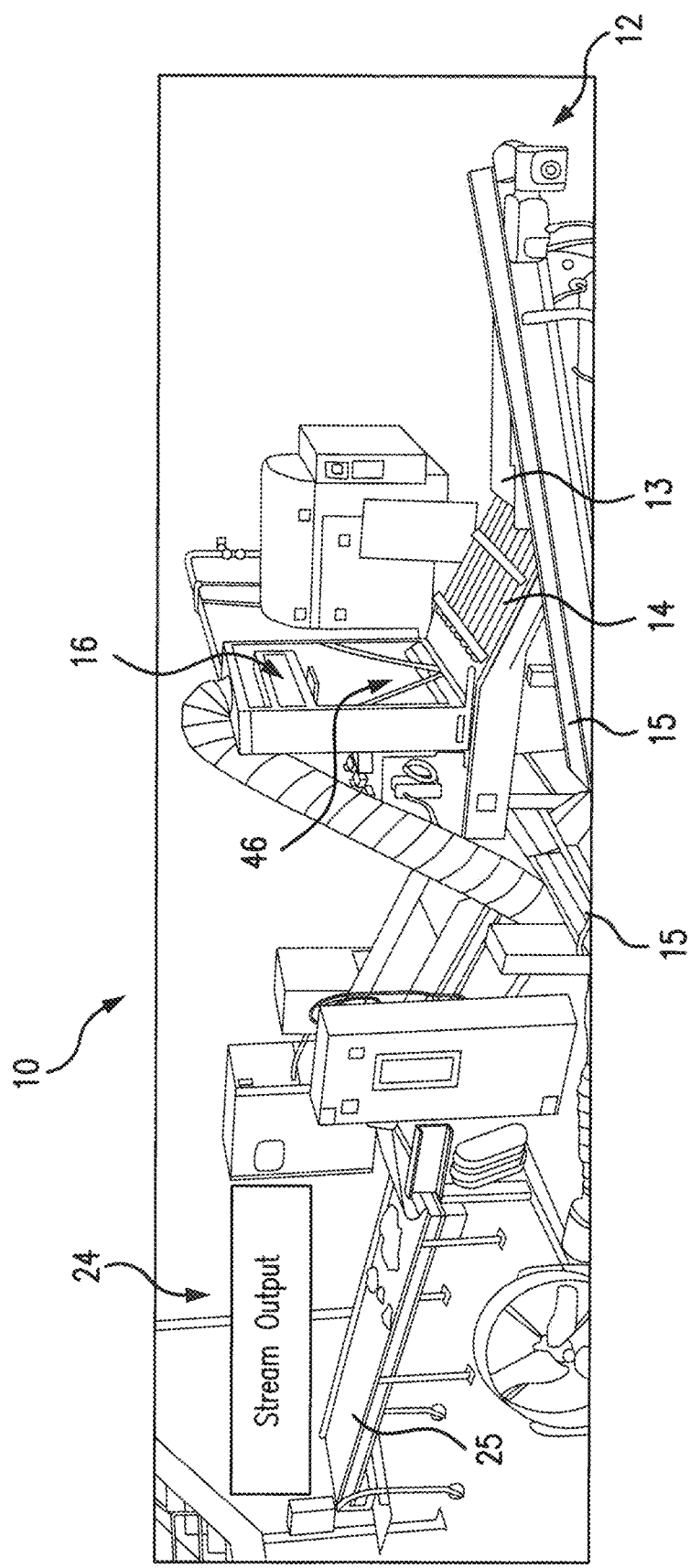

As shown in FIG. 1B, the rejection conveyor 15 is located beneath the conveyor portion 32 of the visual station 16 and is extended in contact with the loading station 12. The rejection conveyor 15, along with the array of the air nozzles 34 following the view camera 38, represents a first rejection stage devised to remove the uncut rejected berries (as will be detailed in further paragraphs) after the vision station 16/cutting station 18, and to re-enter the rejected uncut berries to the loading station 12 for a second chance to be properly oriented on the orientation conveyor 14 and to be qualified as candidates for decalyxing at the calyx removal station 18.

The array 22 of the air nozzles 34' at the unloading station 24, along with the unloading station's portion conveyor 25, operates to remove defects for quality control of the final product (decalyxed high quality strawberries). If necessary, the array 22 and the conveyor 25 serve also as a secondary rejection stage to filter out undesired items including un-cut strawberries and defects, and prevent them from entering the final high quality product.

The subject system further includes a processing sub-system 26 governing the operation of all the parts of the subject system in concert to one another.

The first generation of AVID system (AVID1) presented in U.S. Pat. No. 10,285,429 and incorporated herein in its entirety by reference, solves several key problems in the automatic strawberry decalyxing procedure, including:

(a) the roller rod based strawberry handling system was designed for the strawberry singulation and correct rotation;

(b) the conveyor, computer vision station and waterjet actuation station are well synchronized based on the conveyor shaft encoder. The computer registers each calyx's removal location as coordinates with respect to the conveyor; and (c) in order to maintain an accurate high-quality calyx removal cut, air clamps were designed to stabilize the strawberry before entering the waterjet cutting stream.

The present system is a second generation automated Vision-guided Intelligent strawberry decalyxing (AVID2) system which, although using some of the AVID1's hardware, operates in an improved fashion over the AVID1 system due to the usage of a convolutional neural network (AVIDnet) to replace manually defined standards to discriminate between berries that can be cut or are to be rejected, and to generate strawberry cutline dynamically, which can effectively improve the machine's production capacity.

In addition, to increase the yield of the strawberry processing, the subject system 10 is equipped with the ability of rapid robotic movements that enabled a curved cut along strawberry calyx curvatures (as opposed to the straight cutlines in the preceeding system), i.e., ideal cutlines computed in the subject system. In order to guide the waterjet movement following the ideal cutline trajectory, a regression deep natural network is integrated into the discrimination network.

Specifically, the subject Vision-guided automated intelligent system 10 for removal of calyx from a strawberry is configured with the processor sub-system 26 which is operatively coupled to at least the vision station 16, cutting station (calyx removal station) 18, the unloading station 24, the conveyor sub-system 19, and the array 46 of waterjet knives 20 and the arrays 22, 23, 34, 34' of air jets (nozzles).

As depicted in FIG. 1, the subject system 10 further is integrated with a network training mechanism 300 operatively coupled to the processor sub-system 26 (specifically, to the AVIDnet 66 therein). The network training mechanism 300 includes a bank 302 of the training images, where each training image is provided with a corresponding ground truth cutline 304, as will be detailed in the following paragraphs.

The AVIDnet 66 in the processor sub-system 26 includes a convolutional neural network 306 trained, based on the network training mechanism 300, to make a rejection decision 307, i.e., to identify berries 308 properly aligned and thus able to be cut and berries 310 poorly aligned and thus candidates for being rejected from cutting.

The AVIDnet 66 is further configured with a regression deep neural network 312 integrated with the convolutional neural network 306 and trained to compute a cutline trajectory 314 for the waterjet knives 20 to cut the strawberries 308. The AVIDnet 66 also computes a trajectory 314' for the waterjet knives 20 to follow to avoid the active interaction with the rejected strawberries 310. The computation of the trajectory 314 and 314' is based on the images of the strawberries acquired by the images acquisition sub-system 60 at the vision station 16.

The subject processor sub-system 26 is further configured with a synchronization processor unit 62 which cooperates with at least one shaft encoder 58 configured to track locations of the calyxes based on the images of the strawberries acquired by the images acquisition sub-system 60 at the vision station 16.

The synchronization processor unit 62 is configured to synchronize motion of the conveyor sub-system 19 with actuation of the waterjet knives 20 for cutting the strawberries 308 along a respective cutline trajectory 314 or along the trajectory 314' to refrain from cutting the strawberries 310.

The synchronization processor unit 62 also synchronizes the actuation of the air nozzles 22, 23, 34, 34' with the motion of the conveyor sub-system 19 and the array 46 of the waterjet knives 20 to either hold (immobilize) the strawberries 308 during the cutting (decalyxing) procedure or to remove the rejected strawberries 310 from the conveyor sub-system 19 for being returned to the loading station 12.

Switching from the straight cutline paradigm of the AVID1 system, the present AVID2 system trains a neural network to dynamically cut a flexible curved path output along the calyx, enabling the machine to precisely process fruits that are incorrectly oriented or misshapen, thus boosting the yield of the decalyxing process.

Furthermore, in order to improve the sanitary quality, the subject system designed for total wash-down sanitation with the food contact surfaces isolated, thus reducing the total wash down area required by the industry standards.

The subject system is also improved by its modular configuration which permits to be adapted to 4, 8, 12, or 16-lane models, thus be able to accommodate the needs of a wide variety of customers.

As depicted in FIGS. 1 and 1A-1B, the loading station 12 may include a water tank 30 or a shaker feeder where the strawberries are placed prior to entering the loading conveyor 13 and the orientation conveyor 14 (the loading conveyor 13 and the orientation conveyor 14 may be optionally implemented as a single conveyor and thus may be referred to herein as a loading and orientation conveyor 14). From the water tank 30, the strawberries are automatically lifted and placed on the conveyor 14, and are transported on the conveyor 14 to the vision station (also referred to herein as a calyx identification sub-system) 16.

The vision station 16 is configured to identify and locate the calyx of each strawberry by way of the images acquisition sub-system 60 which may include one or more sensors, such as instantaneous imaging and optics, and is generally configured to detect all calyxes on either a moving or stationary conveyor 32 at the vision station 16 so as to provide strawberry and calyx parameters regardless of their positions, orientations, sizes, and speeds, so that the processor sub-system 26 can determine coordinates of the separation line 314 to remove the calyx from the strawberry flesh.

The conveyor sub-system 19 in the subject system 10 is provided with a number of dividers 33. For example, as shown in FIGS. 1 and 1A-1B, the dividers 33 (depicted as dotted lines) are provided on the loading and orientation conveyor 14. The dividers 33 are preferably provided at the loading and orientation conveyor 14 prior to the vision station 16 and the cutting station 18. Subsequent to the berries processing, their orientation is not critical, and the dividers at the vision, cutting and unloading stations 16, 18 and 24 may be omitted, or may be provided as a matter of a designer's choice.

The dividers 33 may be implemented, for example, as raised rails separating the conveyor belts 14 into lines (valleys) 36 to separate strawberries in the singular lines and keep the singulated strawberries within the lines 36. The dividers 33 may also be configured in any form capable of singulating the strawberries into a number of valleys (rows) 36 and align the berries in each valley 36 in a preferred orientation. The dividers 33 may be also configured as holders, rod or shafts, rollers, coiled rollers, or shaped bed with an exterior profile configured to encourage strawberries to naturally migrate into valleys 36. As an example, the configuration of dividers 33 may be found in U.S. Pat. No. 10,285,429.

Figure 4:
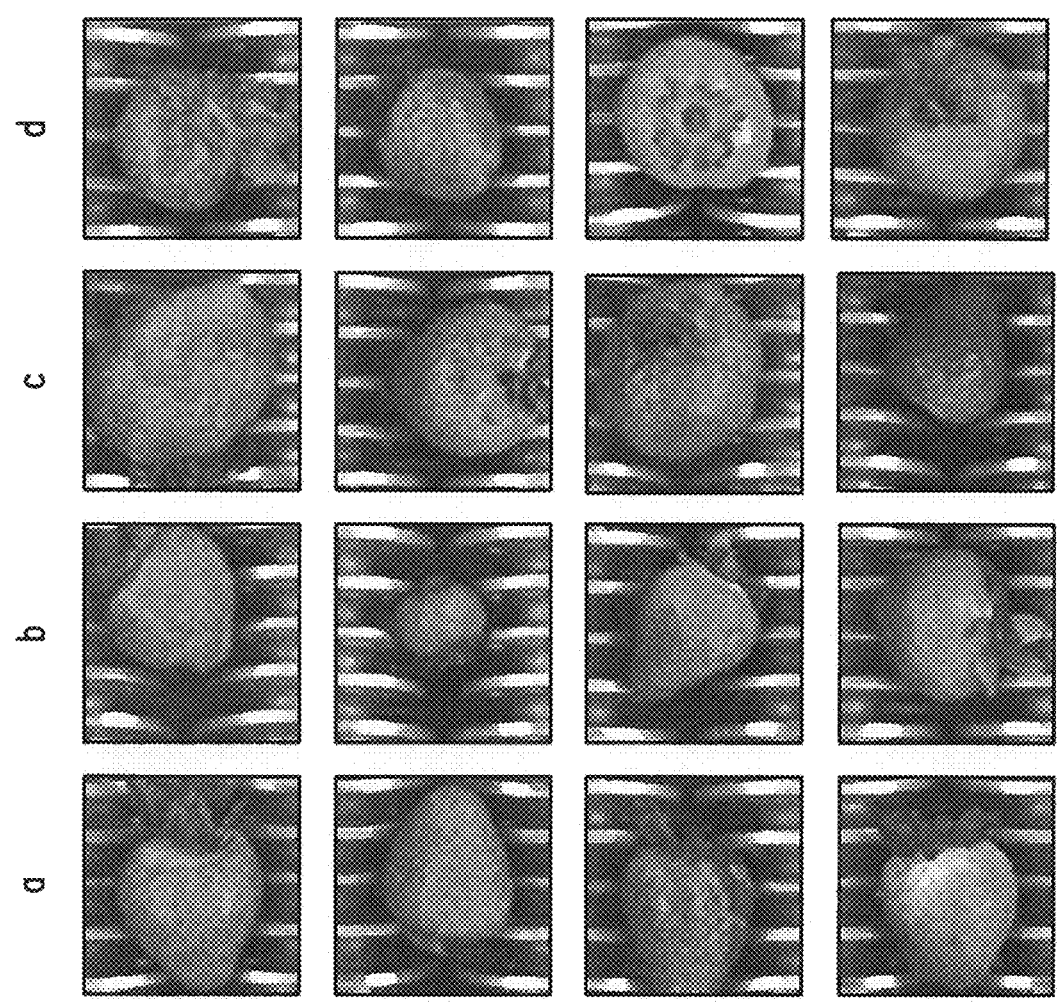

The image acquisition sub-system 60 at the vision station 16 may also include an industrial (or other) imaging camera 38 which can capture continuous images of the fruits surface and identify each calyx location. In addition, or alternatively, to the imaging camera 38, other analog and/or digital imaging systems may be used, including, but not limited to infrared, magnetic, ultrasound, electromagnetic, visual, optical, sonic, as well as sensing devices may be used to identify the location of the portion of the fruit, berry or vegetable to be removed. Also, the vision station 16 is equipped with a high speed imager which includes an array of the imagers, preferably, one for each row 36 of the strawberries travelling on the conveyor 32, for scanning therealong. Once the strawberries (or other fruits and vegetables) exit the vision station 16, multiple views (as shown in FIG. 4), of all calyxes will have been imaged and all calyxes have been identified and located.

The vision station 16 may use single shot, sequential imaging, or a continuous video imaging of the passing strawberries. In an exemplary embodiment, the camera 38 may be an industrial color Charge-Coupled Device (CCD) camera and may be disposed at a stationary position above the conveyor 32 to capture continuous images of strawberries within the field of view. As each strawberry exits the field of view, the location of the calyx is recorded, and the conveyor sub-system 19 may cease rotating the berries such that each strawberry position is fixed relative to the conveyor.

The calyx removal station (or cutting station) 18 operates in conjunction with the vision station 16. The cutting station 18 is represented, as was described in the previous paragraphs and schematically shown in FIG. 1, with the array 46 of the waterjet nozzles 20, and the array 23 of the air nozzles for immobilizing the berries during the cutting procedure. Following the visions/cutting stations 16,18 is the screen sizer 21 which includes a conveyor portion 40 which includes rails/bars forming gaps 42 therebetween on the conveyor 40. Severed calyxes of the after-cut strawberries transported on the conveyor 40 fall down through the gaps 42 and are removed from the system.

A computer 44 is operatively interconnected with the visual processor sub-system 26 and may register and store in the memory a precise position of each calyx in terms of coordinates that are synchronized with the motion of the conveyor sub-system 19.

The calyx removal station 18 is equipped with an array of robotically controlled cutters, for example, high pressure waterjets 20, which are computer controlled to cut the strawberries along a computed ideal curved cutline trajectory 314 as will be presented infra. The high pressure waterjets 20 receive the coordinates of each calyx from the AVIDnet 66 and/or from the computer 44, and subsequently remove the calyx in question in a precision cut along the cutline trajectory 314.

The subject system 10 is equipped with the ability of rapid robotic movements of the cutters 20 that supports a curved uninterrupted cut along strawberry calyx curvatures, i.e., ideal cut lines 314 computed by the AVIDnet 66.

In order to guide the waterjet movement following the ideal cutline trajectory 314, the regression deep natural network 312 is integrated into the discrimination network 306 as will be detailed in the following paragraphs.

In an exemplary embodiment of the subject system, the calyx removal station 18 may include the synchronized waterjet knife or non-blade removal waterjets with an optional fixed or motional configuration. In addition to the waterjets 20, the cutters in the subject system may be presented by non-metal or other blade-free removal cutting mechanisms that receive the coordinates of each calyx from the AVIDnet 66 and/or the computer 44 to remove the calyx with a motion similar to a plotter. The severed calyxes fall downward between adjacent conveyor rollers, and are carried away to a collection bin.

The present system 10 is well applicable to being operative with various mechanisms for removing the identified calyx from strawberries, such as blade, laser, waterjet knife, non-blade cutting devices, and other cutting or removal systems. In some embodiments, the calyx removal station 18 may be fixed such that a number of removal mechanisms may be provided and selectively activated based on the identified position of the calyx for removal.

Alternatively, the cutting mechanism may be motional such that the orientation and/or location of the cutting device may be translated and/or angularity oriented. For example, the calyx removal station 18 may translate in two dimensions so that the cutting device may move to a desired longitudinal position of the strawberry so as to remove a desired portion of the berry.

The waterjet cutters 20 include nozzles which may be fixed or mobile depending on desired cost of the system, accuracy of cut, or a desired maximization of the retained fruit flesh. Nozzles can also translate laterally across the conveyor to remove the terminal end of fruits. The nozzle heads may be also maintained in a fixed lateral position, but permit local orientation so as to move the nozzle heads in a conical trajectory to make a desired separation. Alternatively, the nozzles may be fully mobile, such that they may be translated and locally oriented to position the nozzle in three dimensional orientations, or any one or two dimensional orientations.

A custom pressure pump 48 supplies a high-pressure water stream to the calyx removal station 18, specifically to the nozzles 20. High-pressure stream of water enters a manifold 50 and is passed to the nozzles 20 through flexible metal tubing for axis and angle actuation of the nozzles 20. Position and orientation, as well as actuation/de-actuation, of each nozzle 20 may be locally changed by an actuator 52. The nozzle actuators 52 may be in a format of air cylinders, linear actuators, or rotary actuators.

In one embodiment, the nozzle actuators 52 operate to arrange the nozzles 20 at opposite sides of the calyx removal station's belt 32 such that one nozzle 20 may service the strawberries traveling along the conveyor belt 32, and is dynamically adjusted by the actuators 52 to precisely severe the berries to separate the calyx from the flesh.

The nozzle actuators 52 communicate with the AVIDnet 66 and/or computer 44 as the part of the processing sub-system 26, and/or the vision station 16 to obtain the location of the separation passes (cutline curvatures) for making cuts along the cutline trajectory computed by the processing sub-system 26, and/or computer 44, and/or vision station 16.

The conveyors are equipped with motors 54 and shaft encoders 58 controlling the motion of the conveyor sub-system 19 through the motors. The shaft encoders 58 communicate with the processing sub-system 26, specifically the AVIDnet 66, and/or computer 44, and/or the visual station 16, and the actuators 52 to synchronize the conveyor's motion and the waterjet knifes operation.

The visual station conveyor belt 32, the conveyor belt 40 and the unloading conveyor belt 25 may be implemented as a single conveyor belt sub-system (integral implementation) or may represent separate portions of the conveyor sub-system 19 with their respective motors and shaft decoders and the motion independent one from another but synchronized under the control of the processor sub-system 26. In the integral connected configuration, the single conveyor belt may be equipped with a motor 54 for rotating the shaft 56 of the belt. Such motor may be any type of the motor, but preferably it is a stepper or servo motor capable of precise rotational motion of the shaft of the conveyor belt.

In operative coupling to the motor 54 is a shaft encoder 58 which bi-directionally communicates with the AVIDnet 66 in the processing sub-system 26, and/or computer 44 and/or the visual station 16 to receive/transmit the data on the conveyor and strawberries/calyxes location therefrom/ thereto and to translate data received therefrom into the digital control signals for the motor to attain a desired synchronized motion of the conveyor with the waterjet knives and the air nozzles.

For the separate implementation of the conveyor belts, each belt 32, 40, 25 may be provided with a motor and shaft encoder, which however communicate one with another and with the processing sub-system 26, and/or computer 44 and/or the visual station 16 in order to attain a synchronized operation of all the parts of the system 10.

Once the visual station 16 identifies and registers the coordinates of the strawberries and their respective calyx locations, the processing sub-system 26, specifically, the AVIDnet 66, and/or the computer 44, may direct the waterjet knifes 20 to follow a cutline trajectory across the width of the conveyor 32.

The subject system 10 comprises hardware and/or software executed by the processing sub-system 26 running on, or integrated with, the computer 44 (or another data processing entity) to produce a desired location, orientation and cutline trajectory generation in the most effective, high yield, low waste and precise manner.

As depicted in FIG. 1, the processing sub-system 26 in the subject system 10 governs the operation of the entire system 10. The processing sub-system 26 includes the unique Automatic Vision-guided Intelligent Decalyxing Network (AVIDnet) processor unit 66 which is a convolutional neural network 306 embedded with the discrimination software as will be presented in the following paragraphs. The AVIDnet 66 receives a raw image 80 from an Image Acquisition processor unit 60 (which may be embedded in the vision station 16 or be operatively coupled thereto).

Alternatively, as depicted in FIG. 1, the AVIDnet 66 can receive, at an input thereof, the processed image 100 which results by exposing the raw image 80 to the image foreground/background segmentation routine in an Image Foreground Segmentation processor unit 64 coupled to the Image Acquisition processor unit 60. The Image Acquisition processor unit 60 also outputs the coordinates of the strawberries and their respective calyx locations, so that these data are processed in a Synchronization/Motor Controls processor unit 62 for guiding the conveyor sub-system 19 (32, 40, 25) and the waterjet knifes 20, as well as the air nozzles 22, 23,34, 34' in complete synchronization to one another to severe the strawberries along the cutline trajectory 314 (while the air nozzles 23 hold the strawberry immobilized by the air jets) computed by the AVIDnet 66 to remove the calyxes in the waste reduced and high yield manner, or to lead the waterjet knives 20 along the trajectory 314' to refrain the waterjet knives 20 from active interaction with the rejected strawberries 310 and actuating the air nozzles 34 to remove the rejected berries 310 from the conveyor 32 to the rejection conveyor 15 for recirculation to the loading station 12 to give the rejected berries 310 "a second chance" for being cut if they orient themselves in a proper way on the conveyor 14 for cutting.

The AVIDnet processor unit 66 is bi-directionally coupled to the Synchronization/Motor Controls processor unit 62 to transmit to the Synchronization/Motor Controls processor unit 62 a control signal 102 corresponding to the computed ideal cutline curvature 314 for governing the motor(s) 54 and shaft encoder(s) 58, as well as the waterjet knives 20, and to receive therefrom a signal 106 carrying the information from the shaft encoder(s) 58, as well as the position of the berries and the location of the calyxes.

The AVIDnet processor 66, also computes and sends out, in addition to the signal 102 corresponding to the cutline trajectory 314 for the calyx removal, a signal 108 corresponding to the information which can support a system decision on whether a berry can be cut or should be rejected from the calyx removal procedure.

Specifically, the AVIDnet processor unit 66 supports a second generation automated strawberry decalyxing process and is incorporated in to the subject system 10 to overcome at least two shortcomings associated with the first generation strawberry calyx removal system which pended to be improved with regard to two aspects: (a) the AVIDnet must reject the strawberries with calyx oriented up or down by letting waterjet knives 20 to actively avoid the berries; and (b) for all accepted and rejected berries, a cutline would be generated from strawberry images end-to-end.

In order to address the rejection of the unwanted orientation of the calyx, the AVIDnet 66 outputs the information signal 108 to a Recognition Results processor unit 68 which identifies the berries with the orientation, size and shape not acceptable for the calyx removal procedure, which are candidates for rejection.

An Object Coordinates processor unit 70 is coupled to the Recognition results processor unit 68 to compute coordinates of the identified berries to be rejected, and a Rejection Control processor unit 72 is further coupled to the Object Coordinates processor unit 70 to control the air nozzle arrays 22, 34 and 34' to remove the rejected berries (by controlling the direction and actuation/de-actuation of the air nozzles) from the conveyor 32 into the rejection conveyor 15 and/or from the unloading conveyor 25 at the unloading station 24 (into the residual reservoir 110) and to govern the waterjet knives 20 at the calyx removal station 18 to actively avoid cutting the berries which have been rejected.

Figure 2:
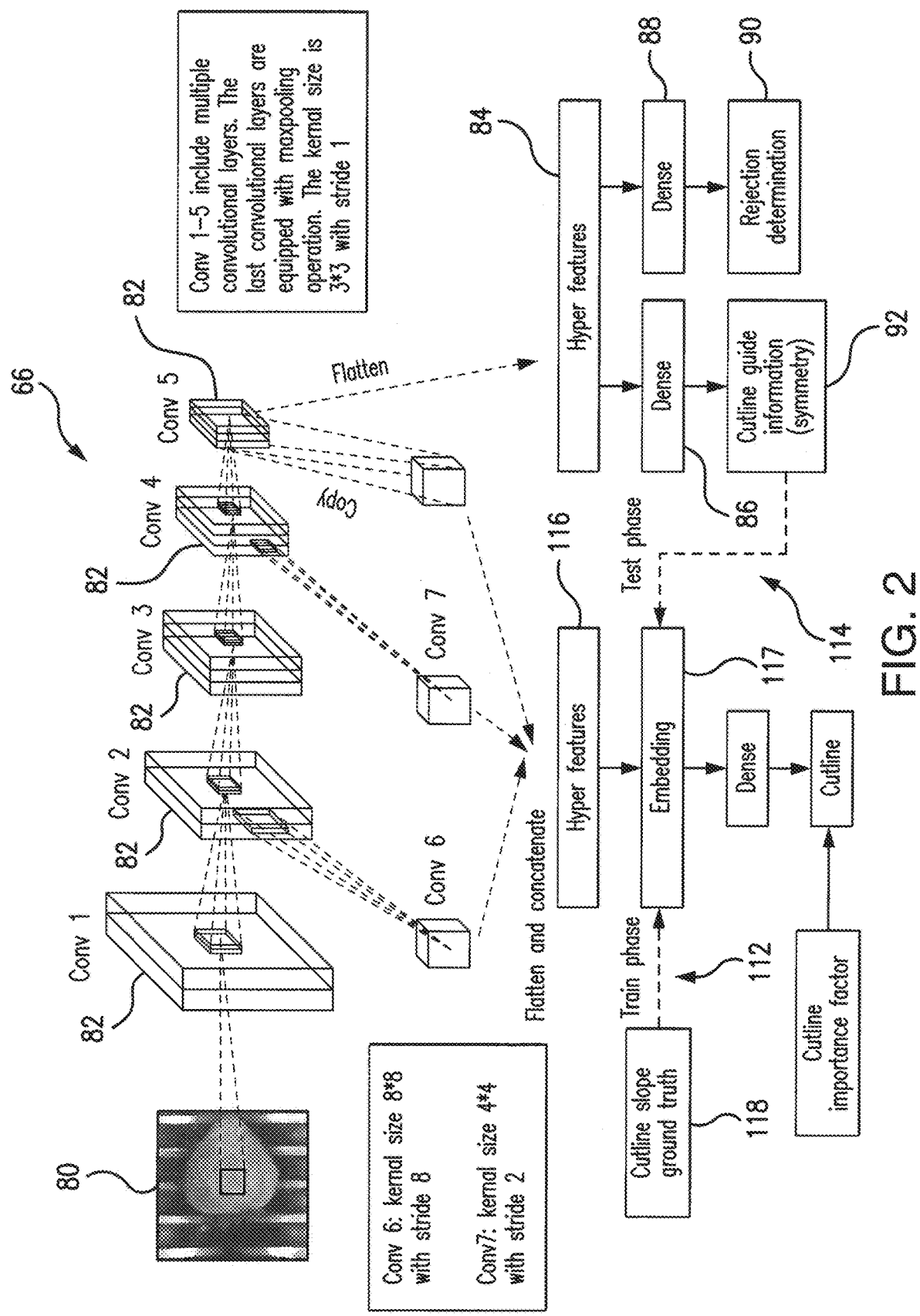
FIG. 2 is the flow-chart diagram representative of the AVIDnet architecture.

As presented in FIGS. 1 and 2, the AVIDnet processor unit 66 receives, as an input, a raw strawberry RGB image 80 from the Image Acquisition processor unit 60. The raw image 80 may be processed in the Image Foreground Segmentation processor unit 64 shown in FIG. 1. In the Foreground Segmentation processor unit 64 the image 80 is exposed to foreground/background separation routine which is a segmentation task with the goal to split the image 80 into the foreground/background and the image corresponding to the strawberry itself.

The AVIDnet processor unit 66 processes the RGB image 80, and generates the cutline locations and rejection determinations, as well as an auxiliary output and cutline guide information, as will be detailed in the following paragraphs.

As depicted in FIG. 2, presenting the architectural principals of the AVIDnet 66, the input of AVIDnet 66 is the raw strawberry image 80. The image 80 passes through several convolutional blocks (Conv1-Conv5) 82. The Image convolution is a filtering technique which is used to modify the spatial frequency characteristics of the image 80 to smooth, sharpen, intensify and enhance the original image. In convolution routine, a matrix is applied to the image 80 and a mathematical operation comprised of integers is executed which works by determining the value of a central pixel by adding the weighted values of all its neighbors together. The output of the convolution procedure is a new modified filtered image.

Each convolution block 82 in the AVIDnet 66 includes multiple convolutional layers. The last convolutional layer in each block 82 is equipped with 2*2 maxpooling operation. This design is close to the concept of the VGG network (presented in K. Simonyan, et al., "Very deep convolutional networks for large-scale image recognition", 2014, arXiv preprint arXiv: 1409. 1556).

The hyper features 84 from the convolutional block 5 connect to the dense layers 86 and 88 to perform the strawberry rejection determination routine 90 and to offer the cutline guide information 92.

The hyper features are used for object identification, i.e., the task of determining, from two images, whether two objects are the same or different. This problem may be approached by modeling a difference between two images, rather than by modeling the images themselves. For this, conditional models are modeled of the difference in appearance between two objects in which the conditioning is a function of the appearance of one of the objects. Modeling the appearance of images directly is very difficult. While the appearance of images is extremely complex, certain simple appearance features of images, such as color, can provide critical conditioning features for modeling image differences. That is, by conditioning on certain simple features of the appearance of an image, one can reduce the complexity of the image difference modeling problem, and make it tractable. These conditioning features are referred to herein as hyper features. This approach to modeling image differences conditioned on image appearance is considered to be successful in the rejection determination routine to identification berries which are not to be cut and should be rejected.

The rejection determination routine 90 aims to find the z-tilted strawberries, which cannot be correctly cut without a rotary motor. FIG. 4 depicts some typical strawberry images, with the size, color and orientation variations. The strawberries in the columns (a) and (b) are not tilted in the z axis directions, and thus can be mechanically processed, i.e., their calyx can be removed. The strawberries in the columns (c) and (d) are tilted up and down in the z axis direction, and thus need to be rejected by the AVIDnet 66 through actuating the rejection control routine in the Rejection Control processor unit 72 (shown in FIG. 1).

The cutline guide information 92 and the embedding layer 94 are two auxiliary designs in the AVIDnet 66 aiming to avoid the "ground truth" contradiction resulting from data labelling and augmentation.

In machine learning, the term "ground truth" refers to the accuracy of the training set's classification for supervised learning techniques. Inaccuracies in the ground truth usually correlate to inaccuracies in the resulting logical decisions.

Figure 5:
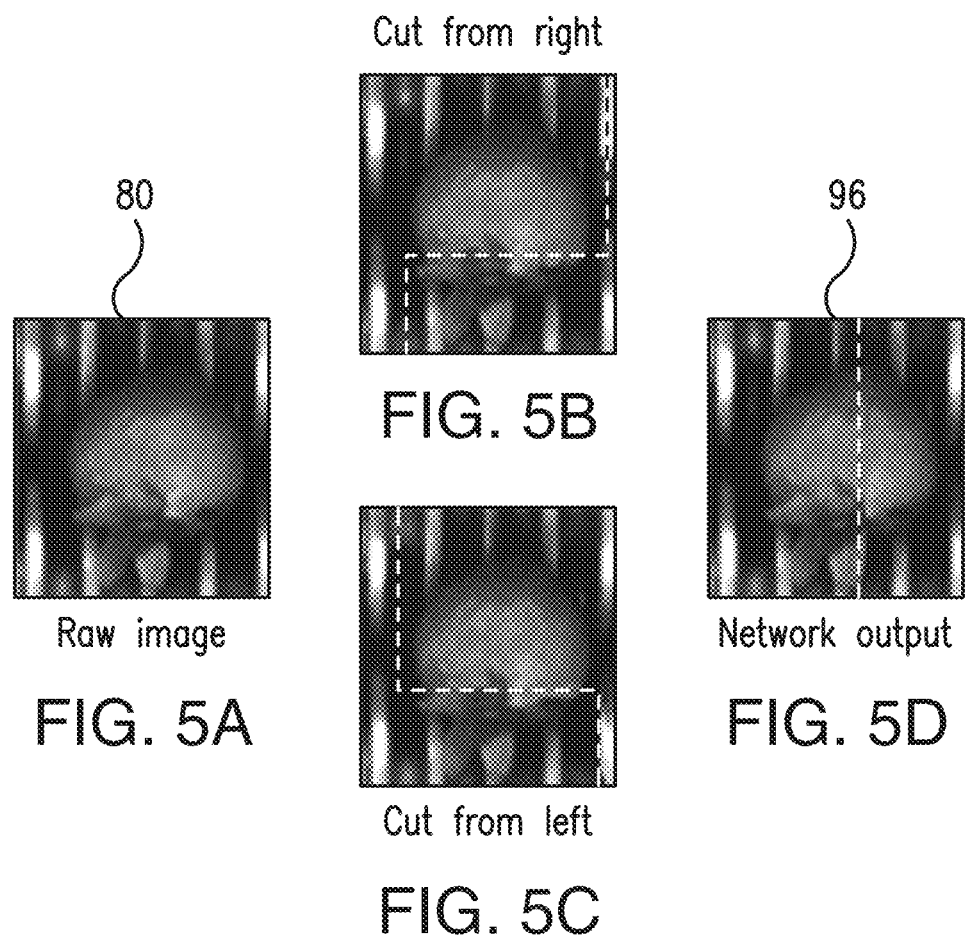
FIG. 5A is a representation of a raw image submitted for processing.
FIGS. 5B-5D depict a typical example of a horizontally symmetric strawberry rotating 90 degrees in XY plane with one cutline from the right (FIG. 5B), and one cutline from the left (FIG. 5C)

FIG. 5A depicts a raw image 80 of a strawberry. FIGS. 5B-5C are illustrative of a typical example of a horizontally symmetric strawberry rotating 90 degrees in XY plane. During the training data augmentation (horizontal flip), the ground truth cutline was flipped accordingly. Because these berries are highly symmetrical in the horizontal axis, the cutline flip could make similar images to have two different cutline ground truth, i.e., one cutline from the right (FIG. 5B), and one cutline from the left (FIG. 5C). The contradictory ground truth can confuse the network training, and the network can produce a compromised output shown as a line 96 in FIG. 5D. The resulting cutline presented in FIG. 5D is the best output for the network, but it is the worst cutline choice in practice.

To solve the problem, the embedding layer 94 is introduced in the AVIDnet 66. Embedding layers have been used to offer the conditional information for a network in other applications (as presented in M. Mirza, et al., "Conditional generative adversarial nets", 2014, arXiv preprint arXiv: 1411. 1784).

In the subject AVIDnet 66, the embedding layer 94 causes the neural network 66 to generate the cutline given three different conditions which include non-horizontally symmetric berries, horizontally symmetric berries with the cutline starting from left to right, and horizontally symmetric berries with the cutline starting from right to left. In the training phase 112, the conditional information could be acquired based on the cutline ground truth, which will be discussed in detail in the next section. However, in the test phase 114, the conditional information is not accessible.

It is needed to know whether the berry is horizontally symmetric or horizontally asymmetric from the strawberry image 80 in the training stage 112. To achieve this goal, the hyper-features 84 and 116 obtained from the Convolution block conv5 depicted in FIG. 2 are used to perform the symmetric classification, and to generate the cutline guide information 92.

In the test phase 114, non-horizontally symmetric berries could be directly processed. Horizontal symmetric berries were allocated a random cutline direction manually to ensure the network function.

Another highlighted design of the AVIDnet 66 is that the features from the Convolution block conv5 have not been used directly to generate the cutline. The features from the Convolution block conv5 include high-level image features which are more suitable for more complex tasks such as an object detection and an image classification (M. D. Zeiler, et al., "Visualizing and understanding convolutional networks", Paper presented at the European conference on computer vision).

For the regression task, such as generating the cutline in the subject application, the maxpooling operations from the Convolution blocks cony 1-conv5 can introduce local invariances which would sacrifice the output resolution and accuracy. To minimize the side effect, the convolutional features in different convolution levels have been fused.

Instead of directly concatenating the features (R. Ranjan, et al., "Hyperface: A deep multi-task learning framework for face detection, landmark localization, pose estimation, and gender recognition", 2019, IEEE Transactions on Pattern Analysis and Machine Intelligence, 41(1), 121-135), the spatial image features with different convolution stride settings were uniformly sampled to ensure the features from different convolution levels have the same dimension. The concatenated features would be embedded with the cutline guide information 92 to generate the cutline. Cutline important factors were designed to weight the cutline predict error when training the neural network. This design came from the fact that in practice, the cutline offsets were less acceptable for calyx region than background region.

Dataset Preparation and Network Training

Figure 3:
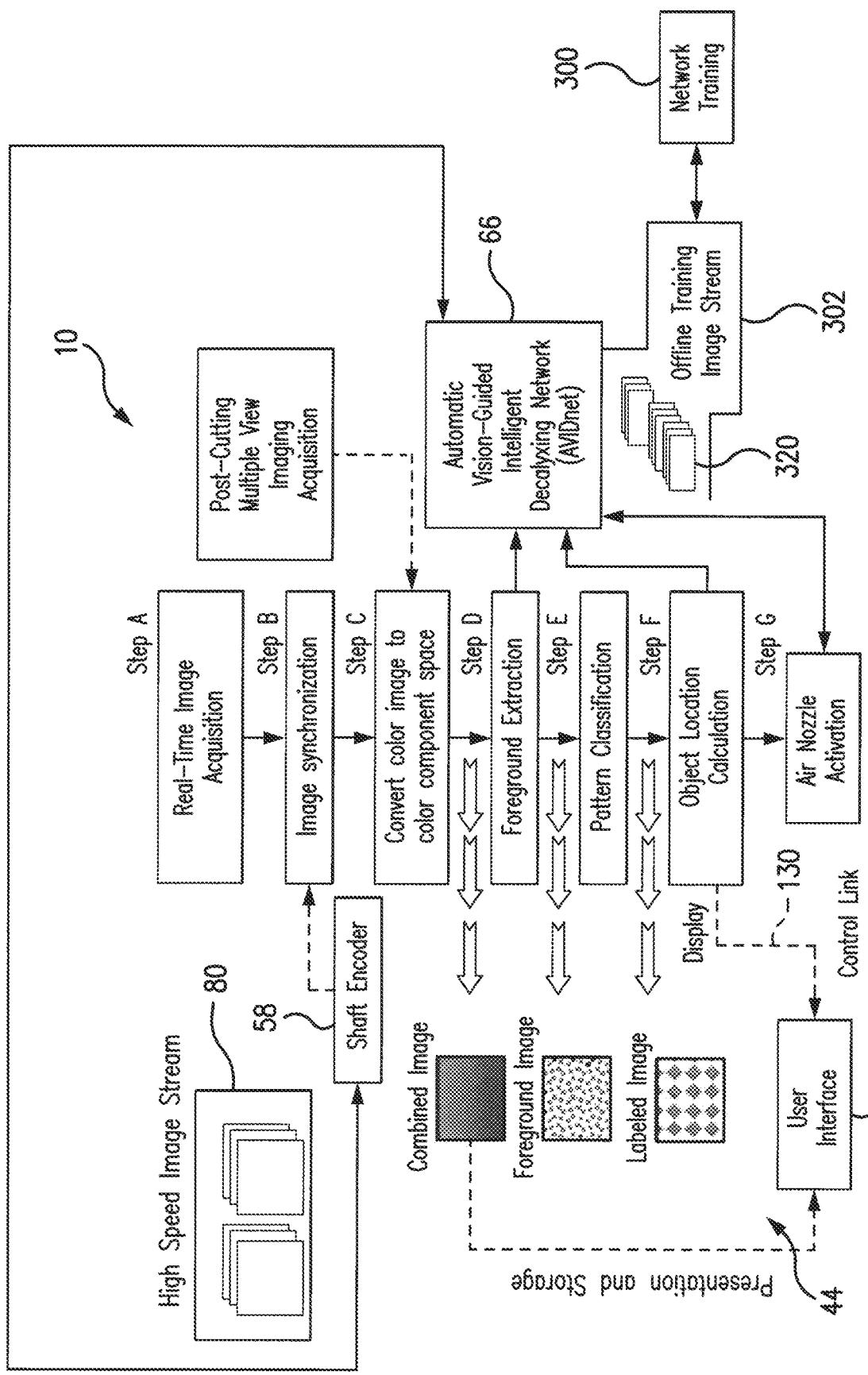
FIG. 3 is the flow-chart diagram representative of the subject system's operation FIG. 4 exemplifies various strawberries shapes and orientations, with the columns (a) and (b) depicting mechanically processable berries, and with the strawberries in columns (c) and (d) tilted up and down in the z axis direction, which are rejected by the AVIDnet.

For the network training 300, as depicted in FIGS. 1-3, total of 1852 strawberry images (128*128) 320 were included in the dataset (bank) 302. 1239 images were of the processable strawberries, while 613 were the images of the strawberries which needed to be rejected.

No statistic numbers were available for sub-class information, including: aligned berries, XY rotated berries, tilted up berries, and titled down berries.

The ground truth cutline trajectories 304 were labelled. The ground truth cutline 304 included 128 points (identified as the number of rows). For each row, an x position was determined.

The waterjet knives movements were much faster than the conveyer movement, and waterjets could accurately follow trajectory. For the 128 cutline points, 128 cutline important factors were allocated accordingly. For the region of calyx, the important factors were set as 1. For the strawberry flesh region, the important factors were set as 0.1. For the background region, the important factors were set as 0.01.

Based on all the information, the ground truth 322 for horizontally symmetric berries classification could be easily acquired based on the slope of cutline 118 (shown in FIG. 2), which could be computed based on the first point of the flesh region and the last point of the flesh region.

If the absolute slope of cutline value was larger than the tan 15°, the berry was regarded as a non-horizontally symmetric berry. If the slope of cutline value was larger than 0, and smaller than tan 15°, the berry was regarded as a horizontally symmetric berry with the cutline from right to left. If the slope value is larger than the −tan 15°, and smaller than 0, the berry was regarded as a horizontally symmetric berry with cutline from left to right. In the images of the berries selected for decalyxing, 1139 images belong to non-horizontally symmetric berries and 100 images belong to horizontally symmetric berries.

Figure 7:
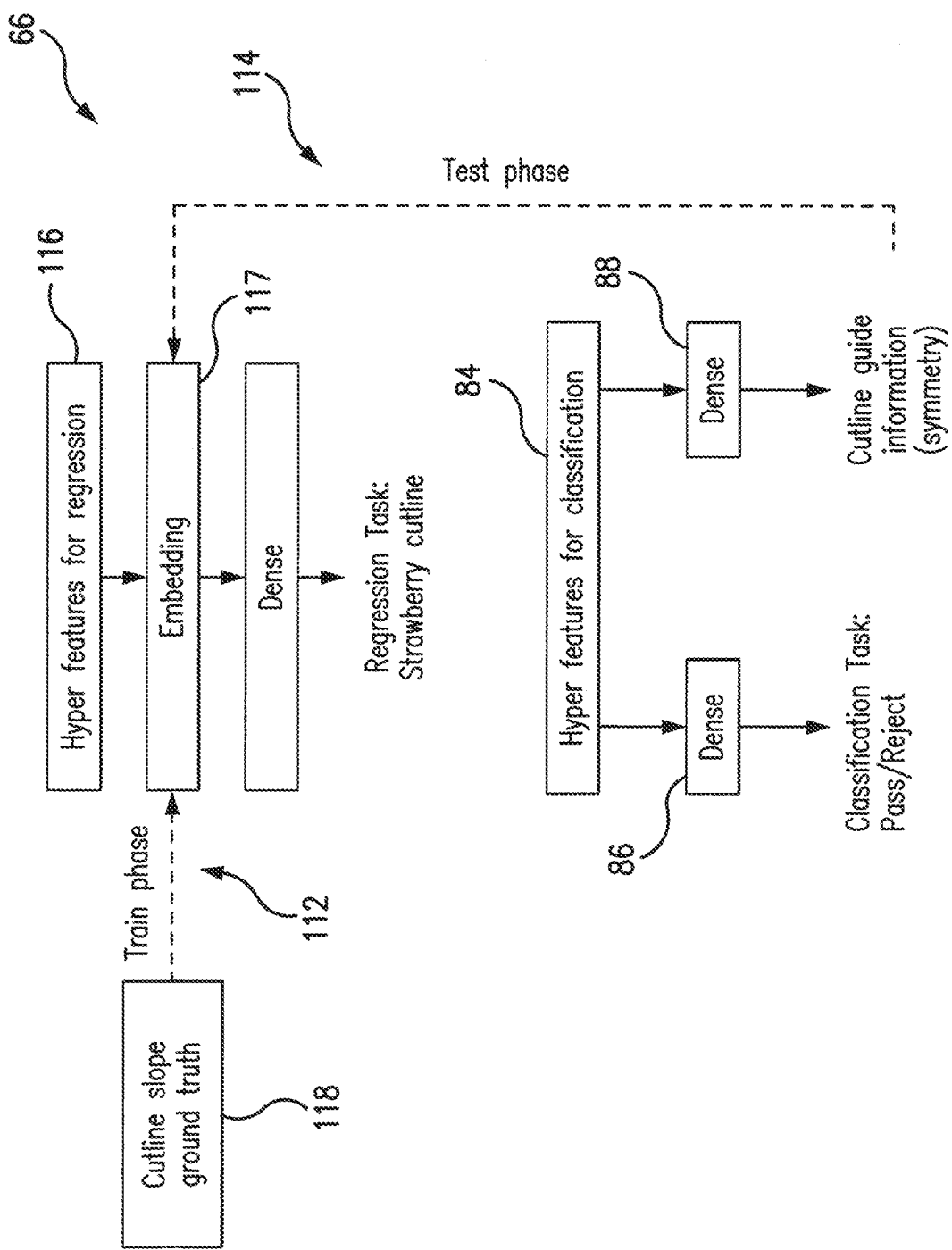
FIG. 7 representative of a flowchart diagram of the embedding routine incorporated in the AVIDnet.

To improve the neural network performance, the dataset was augmented based on translation and horizontal flip. The rejection ground truths did not change for data augmentation. The cutline ground truths needed to be updated for data augmentation. For horizontal flip, the horizontally symmetric ground truths also needed to be updated accordingly. However, for a horizontal symmetric berry (shown in FIG. 5A), its ground truth cutline can start from either left or right. These two conditions (as shown in FIG. 5B-5C) existing in the augmented cutline training dataset, may confuse the network training process. In order to solve this problem, an embedding layer 117 (shown in FIGS. 2 and 7) is added in the AVIDnet 66 as an additional network input. Three auxiliary strawberry conditions are given in the network, including: (a) horizontal asymmetry (FIG. 5A), (b) horizontal symmetry with cutline starting from right (FIG. 5B); and (c) horizontal symmetry with the cutline starting from left (FIG. 5C). As shown in FIGS. 2 and 7, in the network training phase 112, the additional information can be acquired through the prepared ground truth. In the test phase 114, the symmetry status can be acquired from the afore-presented auxiliary strawberry conditions in the strawberry symmetry classifier, and the starting point position (right or left0 can be assigned by users. For a symmetric berry, the final cutline can start either from right or left.

To train the AVIDnet 66, a loss function was determined. The loss functions for rejection ($L_1$) and horizontal symmetric ($L_2$) classification are the binary cross entropy. $L_3$ is the mean squared error for cut positions. $L_4$ is the normalized importance weighted mean squared error for cut positions. The mathematic expressions of $L_1$ to $L_4$ are presented in Eq. 1.

$$\begin{cases} L_1 = -a\log(an) - (1-a)\log(1-an) \\ L_2 = -h\log(hn) - (1-h)\log(1-hn) \\ L_3 = 1(\text{Input} \in \text{processable})\sum_{i=1}^{128} \frac{(P_i - Pn_i)^2}{128} \\ L_4 = 1(\text{Input} \in \text{processable}) \\ \sum_{i=1}^{128} \sum_{\substack{region \in \\ \{background, \\ meat, calyx\}}} \frac{1(P_i \in \text{region})(P_i * IF_i - Pn_i * IFn_i)^2}{\sum_{j=1}^{128} 1(P_j \in \text{region})} \end{cases}$$ (Eq. 1)

In $L_1$, a represents the ground truth for a probability for a strawberry processing. If the strawberry is to be rejected, a=0. Otherwise, a=1; and an represents the network output for strawberry processable probability.

In $L_2$, h represents the ground truth probability of a horizontal symmetric strawberry. If the strawberry is horizontally symmetric, then h=1. Otherwise, h=0. The hn represents the network output for horizontal symmetric probability.

In $L_3$, $P_i$ represents the $i^{th}$ cutline position for ground truth; $Pn_i$ is a cutline position output from the neural network 66; and 1(*) represents the indicator function. In $L_3$, only the cutlines for processable strawberries are considered. $L_4$ is designed as the mean square error weighted by importance factors, where the IF represents the preset cutline importance factor. Because different importance factors for different image regions (calyx, flesh, background) are allocated, the size of three regions varied a lot in different images due to strawberry variations. To stabilize the network training process, the square errors of the importance factors were normalized based on the size of three image regions Similar to the $L_3$, rejected strawberries needed to be excluded in the $L_4$.

The total loss of the network AVIDnet 66 could be expressed as a weighted sum of $L_1$ to $L_4$, expressed in Eq. 2. In the experiment, the losses were not weighted and $\varphi_1 \ldots \varphi_4$ were all set as 1.

$$L_{total} = \varphi_1 L_1 + \varphi_2 L_2 + \varphi_3 L_3 + \varphi_4 L_4$$ (Eq. 2)

Referring to FIG. 3 which represents the subject Automatic Vision Intelligence guided strawberry decalyxing system's implementation modules and procedure flow chart, and also in conjunction with FIGS. 1 and 2, the subject process starts in Step A "Real time Image Acquisition" where the vision station 16 acquires a High Speed Stream of images of the strawberries which travel on the conveyor 32 in various orientations, either aligned, slightly tilted, diagonal, perpendicular, calyx-up, or tip-up.

The images acquired in Step A, are exposed in Step B to the Image Synchronization routine involving also the data received from the Shaft Encoder 58 for vision-guided motor control.

In the subsequent Step C, the color images are converted to color component space, and the logic sends the resulting Combined Image to the memory of the computer 44 for storage therein. The Combined Image is subsequently provided to the User Interface 45 for presentation to a user.

From Step C, the procedure advances to Step D for the Foreground/background Extraction. The resulting Foreground image is stored in the memory of the computer 44 as a Foreground Image.

The image of the strawberry cleared from the foreground pixels is transmitted to the AVIDnet 66 for further processing to accomplish a dual function: (a) discriminate between the berries which meet the criteria for being decalyxed and those which cannot be cut, and thus are rejected, and (b) for those berries which are selected for decalyxing, to compute a cutline trajectory 314 and to generate a control signal for the Shaft encoder/motor and waterjet knives to synchronize their operation and to guide the waterjet knives along the computed cutline trajectory (while holding the strawberry down on the conveyor 32 by the air streams produced by the air nozzles) and severe the calyx from the strawberry flesh in the waste reduced manner. The AVIDnet 66 also uses the received information to guide the waterjet knives 20 along the trajectory 314' from active interaction with the rejected strawberries to prevent the cutting.

From Step D, the logic moves to Step E for the pattern classification, where the Images free of the Foreground pixels are labeled, and the Labeled Image is stored in the memory of the computer 44.

From Step E, the procedure advances to the Step F for object location calculation for the berries allowed for decalyxing and for those berries which were rejected. The coordinates of the berries which are to be decalyxed are sent to the AVIDnet 66 to generate a control signal for the motor/encoder and the waterjet knives in a synchronized fashion to severe the calyx from the flesh of the berry. The control signal corresponding to the cutline 314 is also sent to the air nozzles 22 to synchronize their actuation in step G with the waterjet knives to hold the berries fixed by the air jets during the cutting process.

The coordinates of the rejected berries are also sent to the AVIDnet 66 to generate a control signal corresponding to the trajectory 314' for the waterjet knives 20 to refrain them from cutting the rejected strawberries, and another control signal provided to the air nozzle arrays 34, 34', 22 for the air nozzles activation in Step G to remove the rejected berries from the conveyors 32, 40, 24, respectively, onto the rejection conveyor 15 and/or into the residual tank 110.

A control link 130 is established between the object location calculation processor unit (Step F) and the User interface 45 for the information display and entering the user's commands, instructions and data.

Returning to FIGS. 1 and 2-3, the Synchronization/Motor Control processing unit 62 is operatively coupled to the Image Acquisition processor unit 60 to receive therefrom images of the strawberries on the conveyor system 32 to accomplish the vision-guided motor control motion for calyx cutting. One of the key advancement of the motor controls in the subject system is the ability to follow the 128 point spline for each cup with low latency and high precision. This advancement requires a number of sub-systems operating in concert, including an accurate shaft encoder input, robust internal system messaging, and high speed buffered point to point movement.

All of these upgrades have been incorporated together in a comprehensive PLC program to enable the key advancement.

The major milestone was to acquire the ability to reliably monitor and parse the digital signals from the shaft encoder 58 at a high rate. Being able to differentiate every signal was the key to achieve a necessary resolution for the 128 point spline. Another milestone was to establish the data link to send the splines from the image processing system 60, 64 to the motor control system 62.

One of the tasks within the scope of the motor controls was to change the motor controls communication protocol. The communication protocol in the previous system (AVID1) was Modbus over TCP/IP. While this communication protocol was reasonably robust and easy to use, it has a significant lag time, and was poorly equipped for creating buffered point to point moves. After researching the available communication protocols that are used in industry, it was decided to use the Ethercat communication protocol (or another Fast protocol) for its advantageously lowest lag times. This required adaptation of the Ethercat compatible fieldbus and PLC. An efficient program was created in this environment to implement point to point movements on a deterministic time scale.

Another task was to determine how the digital input from the shaft encoder 58 would be received so the point to point movement could be synchronized to the motion of the conveyor sub-system 19.

There are multiple options available to solve this problem, all of which are related to the way the digital input module is connected to the rest of the system, and the way to generate and handle interrupts in that system, so that the digital input can be responded to with minimal latency.

The three most promising options explored for the subject system included: (1) a digital input module over a USB connection with a Windows interrupt; (2) a digital input module over a PCIE bus connection with a Windows interrupt; and (3) a digital input module connected to the fieldbus system with internal polling.

All the above-presented systems were tested and the test results were compared. The USB connection was found infeasible because it would skip some of the input pulses. The PCIE board experienced the similar problem. When the PCIE board sent an interrupt to the Windows system, it would sometimes miss input pulses. Shown in FIG. 1, the fieldbus system 330 was the most robust. Internally the fieldbus 330 constantly checks whether a new digital pulse has been received, and manages the DIO thread versus the movement thread. Robust synchronization of the threads was implemented to solve the problem.

The fieldbus system 330 also required a separate messaging protocol 332 to feed the spline information to the fieldbus system from the Windows application. For example, the messaging mechanism may be created with Beckhoff's ADS (Automation Device Specification) framework, capable of device independent communication.

The allowed packets were transferred between the fieldbus 330 and the image processing system 26. Each packet included the 128 point spline, an importance Boolean flag for each point in the spline, and an index based on the shaft encoder input. These packets were assembled into a buffer frame on the fieldbus system, and mapped to their encoder index. The messaging mechanism, the digital input system and point to point actuation have been created to attain a control system that could move the nozzle in a continuous spline, with timing synchronized to the conveyor motion, and positions determined by the image processing algorithms.

The important advancement of the imaging processing side is the creation of the N point spline for the motor controls. This required the imaging processing system to first decide if a strawberry is to be cut and, if it is, to create the N points spline that will completely remove the strawberry calyx while minimizing yield loss.

The major milestone within the image processing system was creating the framework to iteratively test any model on an image with an output of a multi-point spline having a number N of points. The number N of points in the multi-point spline may be any number sufficient to compose a curved (curvature) cutline. The number of points N may be 128, 200, 256, etc. The multi-point curvature allowed for multiple test iterations of each of the different networks, and led to the next milestone, i.e., an integrated network, capable of both "cut vs. reject" decision, and the cutting line (also referred to herein as a spline) creation with embedded information about the necessary start position of the spline.

In the subject system, the orientation of a strawberry is classified as being either aligned, slightly tilted, diagonal, perpendicular, calyx-up, or tip-up. The aligned case is considered ideally oriented. The tip-up case is identified as having little to no calyx blob pixels near the fruit blob. The online cutting algorithm needs to identify a poorly oriented strawberry and subsequently commands the waterjet knives to refrain from cutting this particular berry, thus rejecting the berry. The uncut berry is subsequently pushed into a rejection stream and sent into a return cycle for a second chance of orientation and calyx removal.

The majority of strawberries are conical or generally conical in shape. Abnormally shaped strawberries may present issues because they initially do not rotate very well, therefore they become a main source of poorly oriented strawberries. Another factor is the large variations of strawberry sizes, especially those small round strawberries, contribute to high rate of poorly oriented strawberries.

A conventional detection algorithm for identifying poorly oriented strawberry is developed from heuristic knowledge based method, while the samples vary widely. This problem has been addressed more effectively in the subject system by data driven methods. In the subject machine, the network structure AVIDnet is embedded which is configured to implement both (a) identifying poorly oriented strawberry and (b) performing the curved cutting on well oriented strawberries.

This is addressed in the subject system effectively by data driven methods. To create the subject machine learning solution, a large set of labeled images would be created, a network model needed to be designed and trained, and the network should be implemented in a real time environment.

A large bank 302 of high resolution color images 320 was acquired from the field tests, which served as the basis of the ground truth model training 304. Labeling an image involved extracting a 128×128 ROI and marking the cutline by hand.

Images were transformed to increase the size of the training image set. Each labeled images was flipped vertically and horizontally, as well as translated horizontally and vertically. For translations the 128×128 ROI was moved within the overall image.

The network implements two basic tasks: the decision net decides if the strawberry in the image is a rejection berry or can be cut, and the cutline net decides for the berry to be cut, where to locate the 128-point cutting line.

The key importance of the decision net is switching the decision model labels from "yes/no" Boolean flags to percentage based values. This helps to mitigate a problem regarding the difficult to label berries.

The important implementation of the cutline net is to use the loss normalization based on an importance metric. For the image of each berry which can be cut, an importance metric is added to differentiate the pixels on the cutline based on its location relative to the berry. This normalization helped the cutline net converge and decreased jitter in the results.

To achieve a better performance, convolutional high level, middle level and low level image features are concatenated. The concatenated features helped the AVIDnet to keep high resolution information so specific points were not lost during max pooling layers. The specific points were regressed into 128 point splines.

The networks combined multiple dense layers 86, 88 (shown in FIG. 2), branching off from the concatenated features returned by the convolutional layers. A right/left flag has been also embedded in the network that signified if a cutline started on the right or left side of an image. This helped mitigate an issue with berries lying perpendicular to their current cup.

Another important feature of the subject system is to ensure that the AVIDnet is compatible with the human machine interface and motor controls. The python wrapper has been implemented in the main program that is able to import and access all python modules in neural network designs. This allowed the subject system to use the network with very little lag time while still leveraging the multitude of open source resources and frameworks for neural networks, especially the Tensorflow framework and the Keras library.

Experimental Results

In the experimental studies, 1485 images were used for network training, and 367 images were used in the test dataset. The training process was conducted with GeForce GTX TITAN X GPU. The training batch size was 16, and the initial learning rate was $10^{-5}$ for Adam algorithm.

Figure 6:
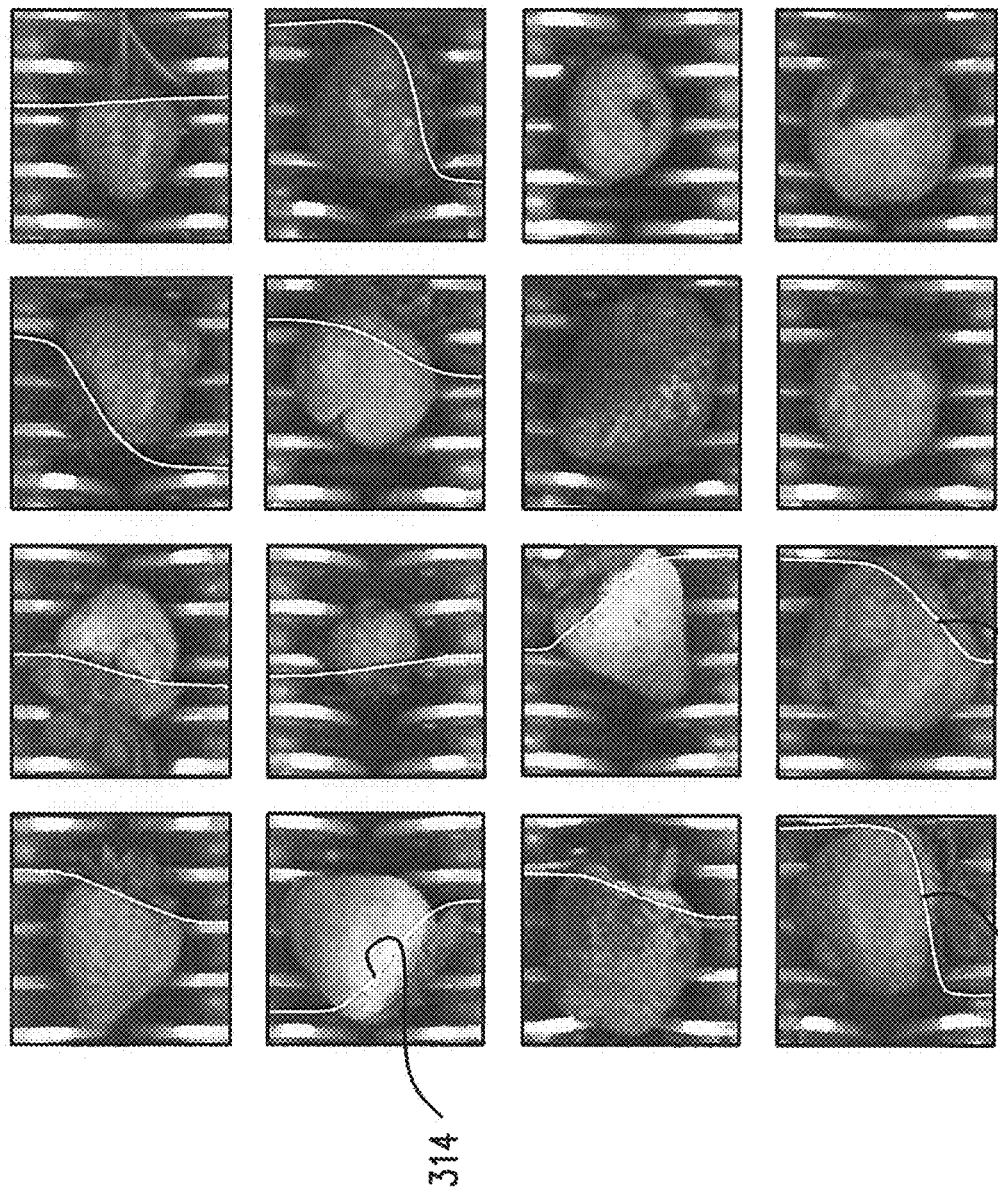
FIG. 6 depicts the output from the AVIDnet.

FIG. 6 shows some typical outputs from the AVIDnet 66. The intelligence output could handle cases like unripe strawberries, berries with dirt and green apex. For the strawberries which tilted slightly in the z axis direction, the AVIDnet could also output the best cutline 314 instead of simply following the boundary of calyx.

Figure 8:
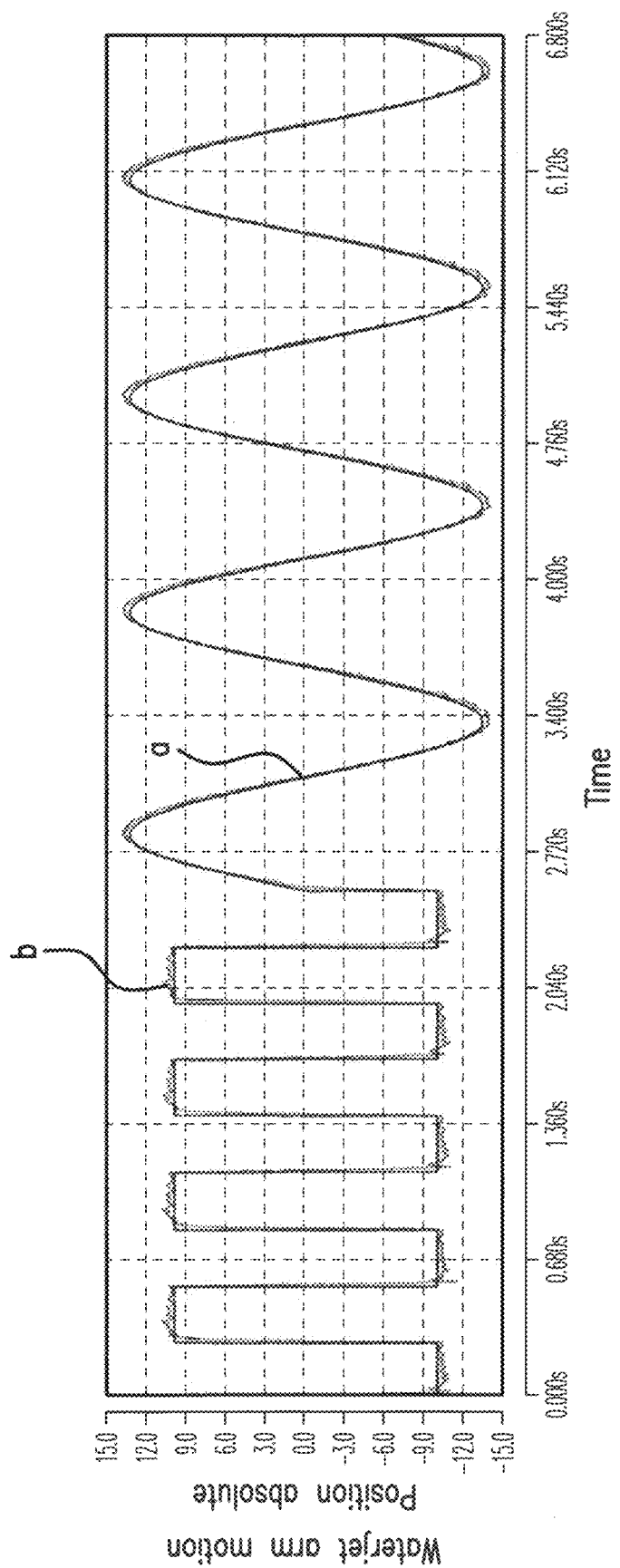
FIG. 8 is a pulse time diagram representative of the low latency and high accuracy of the motor control signal where the horizontal axis is the time axis, and the vertical axis is representative of the waterjet arm motion (or swing) for cutting.

FIG. 8 is a pulse time diagram representative of the low latency and high accuracy of the motor control signal which provides the ability of the fast moving waterjet arm motor controlled curved calyx cutting from the vision-guided motion enhanced by the subject deep learning mechanism. The horizontal axis in FIG. 8 is the time axis, while the vertical axis is representative of the waterjet arm motion (or swing) for cutting. The subject system can follow the multiple N discrete points that represent the curved cutline. In the diagram in FIG. 8, the line "a" is the desired curve (pulse, wave, or strawberry curve cut lines), while the line "b" shows the actual curvature executed by the subject processor sub-system 26 and the waterjet arms 20 instructed by the trajectory 314 generated by the Deep Learning Network 312 (shown in FIG. 1). The waterjets can respond to the Deep Learning Network with the motion which is fast enough (practically instantaneously), within less than a few m/sec lag (referred to herein as latency). The dynamic digital waterjet arm motion is extremely fast in order to achieve a real-time control while strawberries travel fast on the conveyor belt. Such instantaneous response of the waterjet knives 20 to the decision making attained in the subject system was impossible to achieve in the first generation AVID1, and thus represents an additional major milestone in AVID2 in addition to the advantages attained due to the use of the Deep Learning algorithms.

Some statistical results for the test dataset are shown in Table 1. The overall classification accuracy was 91.8%. In practice, the rejection threshold could be adjusted to meet the customer's requirements. Cutline MSE is the unweighted mean squared error for 128 cutline positions. It is equivalent to about average 5 pixel error in the raw images.

TABLE 1

Statistical results for test dataset

| | Rejection decision sensitivity | Rejection decision specificity | Overall accuracy | Cutline MSE |
|---|---|---|---|---|
| Test dataset | 94.5% | 85.6% | 91.8% | $1.52 * 10^{-3}$ |

The subject system and method prove the feasibility of integrating the deep neural network in the AVID machine. The designed AVIDnet offers an end-to-end solution to determine if a strawberry is a good candidate to be processed (cut) and to generate the corresponding waterjet cutline trajectory. In the network design, the symmetry is introduced to avoid the ground truth contradiction accompanying with data labelling and augmentation. Meanwhile, low-level, middle-level and high-level deep features in various convolution layers were fused to ensure the network regression accuracy.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A vision-guided automated intelligent system for removal of an unwanted portion of a produce, comprising:
    a loading station for entering a plurality of produces into the system;
    a vision station operatively coupled to said loading station and equipped with images acquisition sub-system for acquiring images of said plurality of produces received from said loading station;
    a cutting station operatively coupled to said vision station and equipped with a cutting mechanism for removal of an unwanted portion of said plurality of produces, said cutting station being configured to separate the unwanted portions from said plurality of produces according to separation trajectories;
    an unloading station operatively coupled to said cutting station for unloading said plurality of produces devoid of said unwanted portion;
    a conveyor sub-system operatively coupled to said loading, vision, cutting and unloading stations to transport said plurality of produces therealong;
    a processor sub-system operatively coupled at least to said vision, cutting and unloading stations and said conveyor sub-system, and
    a network training mechanism operatively coupled to said processor sub-system, said network training mechanism including a bank of the training images, each training image being provided with a corresponding ground truth cutline;
    wherein said processor sub-system includes
    (a) a convolutional neural network trained, based on said network training mechanism, to identify at least a first produce from said plurality of produces to be cut and at least a second produce from said plurality of produces to be rejected from cutting,
    (b) a regression deep neural network integrated in said convolutional neural network and trained to compute a cutline trajectory for said at least first and second produce based on the images of said plurality of produces acquired by said images acquisition sub-system at said vision station, and
    (c) a synchronization processor unit including at least one shaft encoder configured to track locations of said unwanted portions of said plurality of produces based on the images of said plurality of produces acquired by said images acquisition sub-system at said vision station, wherein said synchronization processor unit is configured to synchronize motion of the conveyor sub-system with actuation of said cutting mechanism for cutting said at least first produce along a respective cutline trajectory computed for said at least first produce and with refraining said cutting mechanism from an interaction with said at least second produce.

2. The system of claim 1, wherein said plurality of produces include a plurality of strawberries, wherein said at least first produce is at least a first strawberry, wherein said at least second produce is at least a second strawberry, and wherein said unwanted portion of the produce is a calyx of the strawberry.

3. The system of claim 2, wherein said conveyor sub-system includes an arranging mechanism configured for separation of said plurality of strawberries entering the loading station into a plurality of rows and orienting at least two of the strawberries in each row in a substantially aligned relationship one with another.

4. The system of claim 3, further including an alignment rejection classification mechanism, and wherein said convolutional neural network is configured to identify said at least first strawberry for cutting and said at least a second strawberry for rejection based on said alignment rejection classification mechanism.

5. The system of claim 2, wherein said processor sub-system is configured to identify a calyx location based on said images acquired by said images acquisition sub-system and to determine separation paths between the calyxes and the strawberries; and wherein said cutting station includes a calyx removal sub-system configured to separate the calyxes from the strawberries according to the separation cutline trajectories determined by the processor sub-system, wherein the calyx removal sub-system is synchronized with said conveyor sub-system by said at least one conveyor shaft encoder configured to track locations of the calyxes.

6. The system of claim 2, wherein said cutting mechanism at said cutting station includes at least an array of robotic high-pressure waterjet knives, wherein said synchronization processor unit communicates with at least one respective robotic waterjet knife from said array thereof to actuate the cutting action along said cutline trajectory computed for said at least first strawberry.

7. The system of claim 2, wherein said cutting mechanism at said cutting station includes at least an array of robotic high-pressure waterjet knives, wherein said synchronization processor unit communicates with at least one respective robotic waterjet knife from said array thereof to de-activate the cutting action thereof with regard to said at least second strawberry or to displace said at least one respective robotic waterjet knife from interaction with said at least second strawberry.

8. The system of claim 7, further including an array of air nozzles configured to interact with said at least first strawberry for immobilization thereof during the cutting action of said at least one respective robotic waterjet knife.

9. The system of claim 3, further including an array of air nozzles configured to interact with said at least second strawberry to remove said at least second strawberry from said conveyor sub-system.

10. The system of claim 2, wherein said conveyor sub-system includes a loading station's conveyor portion, a vision station's conveyor portion, and a unloading station's conveyor portion operatively interconnected one with another and having a shaft mechanism, wherein at least one of said loading station's conveyor portion, vision station's conveyor portion, and unloading station's conveyor portion is equipped with said shaft encoder and a motor control sub-system coupled to said shaft encoder, said cutting mechanism and said shaft mechanism to displace said conveyor sub-system in synchronism with actuation of said cutting mechanism.

11. The system of claim 10, wherein said cutline trajectory for each strawberry is a multi-point spline including a plurality of N of points, where N is an integer, wherein said shaft encoder produces at least one input digital signal for each point from said plurality N of points, wherein said processor sub-system receives and processes said input digital signal from said shaft encoder at a high rate and with high resolution for each said point and generates a corresponding control signal, said corresponding control signal is output from said processor sub-system to said motor control sub-system supported by a communication protocol.

12. The system of claim 11, wherein latency of the receipt of said digital signals at said processor sub-system from said shaft decoder for said plurality N of points is minimized by connecting, between said shaft decoder and said processor sub-system, of a fieldbus with internal polling and synchronization of DIO threads, thus providing the execution of the uninterrupted point-to-point actuation and movement of said cutting mechanism in synchronism with the displacement of said conveyor sub-system.

13. The system of claim 12, further including a messaging mechanism coupled between said fieldbus and said processor sub-system for transmitting packets containing the multi-point spline information therebetween, each of said packets including said multi-point spline, an Importance Boolean flag for each said point of said multi-point spline, and an index based on said shaft encoder's digital input signal, wherein said messaging mechanism is an independent communication mechanism supported at least by an Automated Device Specification (ADS) framework, thus attaining the motion of said cutting mechanism in accordance to said continuous multi-point spline with actuation timing synchronized to the displacement of said conveyor sub-system and positions of the calyx of the strawberries determined by said processor sub-system based on said images produced by said images acquisition sub-system at said vision station.

14. The system of claim 4, wherein said convolutional neural network of said processor sub-system is configured to generate a decision on rejection of said at least second strawberry based on the orientation of said plurality of strawberries classified as being aligned, tilted, diagonal, perpendicular, calyx-up or tip-up, wherein said processor sub-system, based on said decision on rejection generated by said convolutional neural network, commands said cutting mechanism to refrain from interacting with said at least second strawberry being poorly oriented and rejected, and wherein said rejected at least second strawberry is removed from the cutting station and re-enters said loading station.

15. The system of claim 2, wherein said processor sub-system includes an automatic vision-guided intelligent decalyxing network (AVIDnet), said AVIDnet being operatively coupled to said vision station to receive therefrom at least one raw image of a strawberry, said AVIDnet being configured to process said at least one raw image and to generate, at an output thereof, a cutline trajectory location, rejection determination result, auxiliary output information, and cutline guide information,
said AVIDnet being configured with a plurality of convolutional blocks for filtering said at least one raw image, each convolutional block having a number of convolutional layers and a dense layer, wherein one of said convolutional blocks is a source of hyper features of the image, said hyper features of the image being connected to said dense layer of each said convolutional block to result in the strawberry rejection determination and production of the cutline guide information.

16. The system of claim 15, wherein said AVIDnet further comprises the mechanism for avoiding the ground truth contradiction, said mechanism including an embedding layer integrated in said AVIDnet and containing conditional information for the symmetry classification including non-horizontally symmetric strawberries, horizontally symmetric strawberries with the cutline start from left-to-right, and horizontally symmetric strawberries with the cutline start from right-to-left, wherein said hyper features are processed to obtain said symmetry classification.

17. A method for vision-guided automated removal of an unwanted portion of a produce, comprising:
  entering a plurality of produces into a loading station;
  operatively coupling a vision station to said loading station, equipping said vision station with images acquisition sub-system, and acquiring images of said plurality of produces received from said loading station;
  operatively coupling a cutting station to said vision station, establishing a cutting mechanism at said cutting station for removal of an unwanted portion of said plurality of produces, said cutting station being configured to separate the unwanted portions from said plurality of produces according to separation trajectories;
  operatively coupling an unloading station to said cutting station for unloading said plurality of produces devoid of said unwanted portion;
  operatively coupling a conveyor sub-system to said loading, vision, cutting and unloading stations and transporting said plurality of produces therealong;
  operatively coupling a visual data processor sub-system at least to said vision, cutting and unloading stations and said conveyor sub-system, configuring said visual processor sub-system with (a) a convolutional neural network, (b) a regression deep neural network integrated in said convolutional neural network, and (c) a synchronization processor unit configured with at least one shaft encoder;
  operatively coupling a network training mechanism to said visual processor sub-system, and feeding said network training mechanism with a set of training produces images, each produce image being provided with a corresponding ground truth cutline;
  training said convolutional neural network, by operatively interacting with said network training mechanism, to identify at least a first produce from said plurality of produces to be cut and at least a second produce from said plurality of produces to be rejected from cutting;

training said regression deep neural network, by operatively interacting with said network training mechanism, to compute a cutline trajectory for said at least first and second produce based on the images of said plurality of produces acquired by said images acquisition sub-system at said vision station;

tracking, by said shaft encoder, locations of said unwanted portions of said plurality of produces based on the images of said plurality of produces acquired by said images acquisition sub-system at said vision station;

synchronizing, by said synchronization processor unit, displacement of the conveyor sub-system with actuation of said cutting mechanism;

cutting said at least first produce along a respective cutline trajectory computed for said at least first produce; and refraining said cutting mechanism from an interaction with said at least second produce.

18. The method of claim 17, wherein said plurality of produce include a plurality of strawberries, and wherein said unwanted portion of the produce is a calyx of the strawberry, further comprising:

arranging said plurality of strawberries into a plurality of rows and orienting at least two of the strawberries in each row in a substantially aligned relationship one with another, and identifying, by said convolutional neural network, said at least first produce for cutting and said at least a second produce for rejection based on an alignment rejection classification for said plurality of strawberries.

19. The method of claim 18, further comprising:

identifying, by said visual processor sub-system, a calyx location based on said images acquired by said images acquisition sub-system;

determining separation paths between the calyxes and the strawberries;

equipping said cutting station with a calyx removal sub-system configured to separate the calyxes from the strawberries according to the separation cutline trajectories determined by the visual processor sub-system, tracking locations of the calyxes by said shaft encoder, and synchronizing the calyx removal sub-system with said conveyor sub-system.

20. The method of claim 18, further comprising:

forming said cutline trajectory for each strawberry as a multi-point spline including a plurality N of points, where N is an integer, producing, by said shaft encoder, at least one input digital signal for each point from said plurality N of points, coupling a motor control sub-system to said shaft encoder, receiving and processing, at said visual processor sub-system, said input digital signal from said shaft encoder at a high rate and with high resolution for each said point and generating a corresponding control signal, outputting said corresponding control signal from said visual processor sub-system to said motor control sub-system supported by a communication protocol, reducing the latency of the receipt of said digital signals at said visual processor sub-system from said shaft decoder for said plurality N of points by connecting, between said shaft decoder and said visual processor sub-system, of a fieldbus with internal polling and synchronization of DIO threads, thus providing the execution of the uninterrupted point-to-point actuation and movement of said cutting mechanism in synchronism with the displacement of said conveyor sub-system, and coupling a messaging mechanism between said fieldbus and said processor sub-system for transmitting packets containing the multi-point spline information therebetween, each of said packets including said multi-point spline, an Importance Boolean flag for each said point of said multi-point spline, and an index based on said shaft encoder's digital input signal, wherein said messaging mechanism is an independent communication mechanism, thus attaining the motion of said cutting mechanism in accordance to said continuous multi-point spline with actuation timing synchronized to the displacement of said conveyor sub-system and positions of the calyx of the strawberries determined by said processor sub-system based on said images produced by said images acquisition sub-system at said vision station.

* * * * *

UNITED STATES PATENT AND TRADEMARK OFFICE
CERTIFICATE OF CORRECTION

| | |
|---|---|
| PATENT NO. | : 11,531,317 B2 |
| APPLICATION NO. | : 15/929960 |
| DATED | : December 20, 2022 |
| INVENTOR(S) | : Yang Tao et al. |

It is certified that error appears in the above-identified patent and that said Letters Patent is hereby corrected as shown below:

In the Specification

After the Title, insert the following:
--STATEMENT REGARDING FEDERAL SPONSORED RESEARCH OR DEVELOPMENT
This invention was made with Government support under 2016-33610-25699 awarded by USDA. The Government has certain rights in the invention.--

Signed and Sealed this
Third Day of October, 2023

Katherine Kelly Vidal
*Director of the United States Patent and Trademark Office*